US010613567B2

(12) United States Patent
Rooyakkers et al.

(10) Patent No.: US 10,613,567 B2
(45) Date of Patent: Apr. 7, 2020

(54) SECURE POWER SUPPLY FOR AN INDUSTRIAL CONTROL SYSTEM

(71) Applicant: Bedrock Automation Platforms, Inc., San Jose, CA (US)

(72) Inventors: Albert Rooyakkers, Sunnyvale, CA (US); James C. Calvin, Attleboro, MA (US)

(73) Assignee: BEDROCK AUTOMATION PLATFORMS INC., San Jose, CA (US)

( * ) Notice: Subject to any disclaimer, the term of this patent is extended or adjusted under 35 U.S.C. 154(b) by 0 days.

(21) Appl. No.: 15/096,701

(22) Filed: Apr. 12, 2016

(65) Prior Publication Data

US 2016/0224048 A1   Aug. 4, 2016

Related U.S. Application Data

(63) Continuation-in-part of application No. 14/519,032, filed on Oct. 20, 2014, and a continuation-in-part of
(Continued)

(51) Int. Cl.
*H02J 7/00* (2006.01)
*G05F 1/66* (2006.01)
(Continued)

(52) U.S. Cl.
CPC .............. *G05F 1/66* (2013.01); *G05B 15/02* (2013.01); *G06F 21/44* (2013.01); *G09C 1/00* (2013.01);
(Continued)

(58) Field of Classification Search
CPC ........................................................ H02J 7/00
(Continued)

(56) References Cited

U.S. PATENT DOCUMENTS 1,778,549 A   10/1930   Conner
1,961,013 A    5/1934   Saraceno
(Continued)

FOREIGN PATENT DOCUMENTS

CN   2162746 Y   4/1994
CN   1408129 A   4/2003
(Continued)

OTHER PUBLICATIONS

Search Report dated Nov. 4, 2015 for EP Application No. EP14196406.
(Continued)

*Primary Examiner* — Mohammed Alam
(74) *Attorney, Agent, or Firm* — Kevin E. West; Advent, LLP

(57) ABSTRACT

A power supply is disclosed for an industrial control system or any system including a distributed power supply network. In embodiments, the power supply comprises: a battery module including a battery cell and a battery monitor configured to monitor the battery cell; and a self-hosted server operatively coupled with the battery module, the self-hosted server being configured to receive diagnostic information from the battery monitor and provide network access to the diagnostic information. In implementations, the diagnostics stored by the self-hosted server can be broadcast to or remotely accessed by enterprise control/monitoring systems, application control/monitoring systems, or other remote systems via a secured network (e.g., secured access cloud computing environment).

21 Claims, 12 Drawing Sheets

Related U.S. Application Data application No. PCT/US2013/053721, filed on Aug. 6, 2013, and a continuation-in-part of application No. 14/469,931, filed on Aug. 27, 2014, now Pat. No. 9,191,203, and a continuation-in-part of application No. 14/446,412, filed on Jul. 30, 2014.

(60) Provisional application No. 62/146,796, filed on Apr. 13, 2015, provisional application No. 61/940,003, filed on Feb. 14, 2014, provisional application No. 62/021,438, filed on Jul. 7, 2014.

(51) Int. Cl.
| | | |
|---|---|---|
| *H04L 9/32* | (2006.01) | |
| *G05B 15/02* | (2006.01) | |
| *G09C 1/00* | (2006.01) | |
| *H01M 10/42* | (2006.01) | |
| *H01M 10/48* | (2006.01) | |
| *G06F 21/44* | (2013.01) | |
| *H02J 7/34* | (2006.01) | |
| *H02J 13/00* | (2006.01) | |

(52) U.S. Cl.
CPC ... *H01M 10/4207* (2013.01); *H01M 10/4257* (2013.01); *H01M 10/482* (2013.01); *H02J 7/0021* (2013.01); *H02J 7/0047* (2013.01); *H02J 7/34* (2013.01); *H02J 13/00* (2013.01); *H04L 9/3263* (2013.01); *H01M 2010/4278* (2013.01); *Y10T 307/50* (2015.04); *Y10T 307/62* (2015.04)

(58) Field of Classification Search
USPC .......................................................... 320/132
See application file for complete search history.

(56) References Cited

U.S. PATENT DOCUMENTS

| | | |
|---|---|---|
| 2,540,575 A | 2/1951 | Finizie |
| 3,702,983 A | 11/1972 | Chace et al. |
| 4,079,440 A | 3/1978 | Ohnuma et al. |
| 4,082,984 A | 4/1978 | Iwata |
| 4,337,499 A | 6/1982 | Cronin et al. |
| 4,403,286 A | 9/1983 | Fry et al. |
| 4,508,414 A | 4/1985 | Kusui et al. |
| 4,628,308 A | 12/1986 | Robert |
| 4,656,622 A | 4/1987 | Lea |
| 4,691,364 A | 9/1987 | Jobe |
| 4,882,702 A | 11/1989 | Struger et al. |
| 4,929,939 A | 5/1990 | Varma et al. |
| 4,932,892 A | 6/1990 | Hatch |
| 5,013,247 A | 5/1991 | Watson |
| 5,229,652 A | 7/1993 | Hough |
| 5,325,046 A | 6/1994 | Young et al. |
| 5,378,166 A | 1/1995 | Gallagher, Sr. |
| 5,385,487 A | 1/1995 | Beitman |
| 5,385,490 A | 1/1995 | Demeter et al. |
| 5,388,099 A | 2/1995 | Poole |
| 5,422,558 A | 6/1995 | Stewart |
| 5,469,334 A | 11/1995 | Balakrishnan |
| 5,519,583 A | 5/1996 | Kolling et al. |
| 5,546,463 A | 8/1996 | Caputo et al. |
| 5,590,284 A | 12/1996 | Crosetto |
| 5,602,754 A | 2/1997 | Beatty et al. |
| 5,603,044 A | 2/1997 | Annapareddy et al. |
| 5,719,483 A | 2/1998 | Abbott et al. |
| 5,735,707 A | 4/1998 | O'Groske et al. |
| 5,773,962 A | 6/1998 | Nor |
| 5,860,824 A | 1/1999 | Fan |
| 5,896,473 A | 4/1999 | Kaspari |
| 5,909,368 A | 6/1999 | Nixon et al. |
| 5,951,666 A | 9/1999 | Ilting et al. |
| 5,958,030 A | 9/1999 | Kwa |
| 5,980,312 A | 11/1999 | Chapman et al. |
| 6,009,410 A | 12/1999 | LeMole et al. |
| 6,046,513 A | 4/2000 | Jouper et al. |
| 6,124,778 A | 9/2000 | Rowley et al. |
| 6,178,474 B1 | 1/2001 | Hamano et al. |
| 6,219,789 B1 | 4/2001 | Little et al. |
| 6,220,889 B1 | 4/2001 | Ely et al. |
| 6,347,963 B1 | 2/2002 | Falkenberg et al. |
| 6,435,409 B1 | 8/2002 | Hu |
| 6,453,416 B1 | 9/2002 | Epstein |
| 6,480,963 B1 | 11/2002 | Tachibana et al. |
| 6,490,176 B2 | 12/2002 | Holzer et al. |
| 6,574,681 B1 | 6/2003 | White et al. |
| 6,597,663 B1 | 7/2003 | Gehring et al. |
| 6,643,777 B1 | 11/2003 | Chu |
| 6,680,904 B1 | 1/2004 | Kaplan et al. |
| 6,695,620 B1 | 2/2004 | Huang |
| 6,799,234 B1 | 9/2004 | Moon et al. |
| 6,812,803 B2 | 11/2004 | Goergen |
| 6,814,580 B2 | 11/2004 | Li et al. |
| 6,828,894 B2 | 12/2004 | Sorger et al. |
| 6,840,795 B1 | 1/2005 | Takeda et al. |
| 6,988,162 B2 | 1/2006 | Goergen |
| 7,164,255 B2 | 1/2007 | Hui |
| 7,172,428 B2 | 2/2007 | Huang |
| 7,200,692 B2 | 4/2007 | Singla et al. |
| 7,234,963 B1 | 6/2007 | Huag |
| 7,254,452 B2 | 8/2007 | Davlin et al. |
| 7,402,074 B2 | 7/2008 | LeBlanc et al. |
| 7,415,368 B2 | 8/2008 | Gilbert et al. |
| 7,426,585 B1 | 9/2008 | Rourke |
| 7,460,482 B2 | 12/2008 | Pike |
| 7,510,420 B2 | 3/2009 | Mori |
| 7,526,676 B2 | 4/2009 | Chou et al. |
| 7,529,862 B2 | 5/2009 | Isani et al. |
| 7,536,548 B1 | 5/2009 | Batke et al. |
| 7,554,288 B2 | 6/2009 | Gangstoe et al. |
| 7,587,481 B1 | 9/2009 | Osburn, III |
| 7,614,909 B2 | 11/2009 | Lin |
| 7,619,386 B2 | 11/2009 | Sasaki et al. |
| 7,622,994 B2 | 11/2009 | Galal |
| 7,660,998 B2 | 2/2010 | Walmsley |
| 7,670,190 B2 | 3/2010 | Shi et al. |
| 7,685,349 B2 | 3/2010 | Allen et al. |
| 7,730,304 B2 | 6/2010 | Katsube et al. |
| 7,746,846 B2 | 6/2010 | Boora et al. |
| 7,761,640 B2 | 7/2010 | Hikabe |
| 7,774,074 B2 | 8/2010 | Davlin et al. |
| 7,790,304 B2 | 9/2010 | Hendricks et al. |
| 7,811,136 B1 | 10/2010 | Hsieh et al. |
| 7,815,471 B2 | 10/2010 | Wu |
| 7,822,994 B2 | 10/2010 | Hamaguchi |
| 7,839,025 B2 | 11/2010 | Besser et al. |
| 7,872,561 B2 | 1/2011 | Matumoto |
| 7,948,758 B2 | 5/2011 | Buhler et al. |
| 7,960,870 B2 | 6/2011 | Besser et al. |
| 7,971,052 B2 | 6/2011 | Lucas et al. |
| 8,013,474 B2 | 9/2011 | Besser et al. |
| 8,019,194 B2 | 9/2011 | Morrison et al. |
| 8,032,745 B2 | 10/2011 | Bandholz et al. |
| 8,062,070 B2 | 11/2011 | Jeon et al. |
| 8,125,208 B2 | 2/2012 | Gyland |
| 8,132,231 B2 | 3/2012 | Amies et al. |
| 8,143,858 B2 | 3/2012 | Tsugawa et al. |
| 8,149,587 B2 | 4/2012 | Baran et al. |
| 8,157,569 B1 | 4/2012 | Liu |
| 8,181,262 B2 | 5/2012 | Cooper et al. |
| 8,189,101 B2 | 5/2012 | Cummings et al. |
| 8,212,399 B2 | 7/2012 | Besser et al. |
| 8,266,360 B2 | 9/2012 | Agrawal |
| 8,281,386 B2 | 10/2012 | Milligan et al. |
| 8,287,306 B2 | 10/2012 | Daugherty et al. |
| 8,295,770 B2 | 10/2012 | Seil et al. |
| 8,310,380 B2 | 11/2012 | Aria et al. |
| 8,380,905 B2 | 2/2013 | Djabbari et al. |
| 8,390,441 B2 | 3/2013 | Covaro et al. |
| 8,465,762 B2 | 6/2013 | Lee et al. |
| 8,480,438 B2 | 7/2013 | Mattson |
| 8,560,147 B2 | 10/2013 | Taylor et al. |

(56) References Cited

U.S. PATENT DOCUMENTS

| | | |
|---|---|---|
| 8,587,318 B2 | 11/2013 | Chandler et al. |
| 8,651,874 B2 | 2/2014 | Ku et al. |
| 8,694,770 B1 | 4/2014 | Osburn, III |
| 8,777,671 B2 | 7/2014 | Huang |
| 8,862,802 B2 | 10/2014 | Calvin et al. |
| 8,868,813 B2 | 10/2014 | Calvin et al. |
| 8,971,072 B2 | 3/2015 | Calvin et al. |
| 9,071,082 B2 | 6/2015 | Nishibayaski et al. |
| 9,318,917 B2 | 4/2016 | Kubota et al. |
| 9,436,641 B2 | 9/2016 | Calvin et al. |
| 9,465,762 B2 | 10/2016 | Calvin et al. |
| 9,812,803 B2 | 11/2017 | Toyoda et al. |
| 10,103,875 B1 | 10/2018 | Roth et al. |
| 2002/0070635 A1 | 6/2002 | Dadafshar |
| 2002/0084698 A1 | 7/2002 | Kelly et al. |
| 2002/0086678 A1 | 7/2002 | Salokannel et al. |
| 2002/0095573 A1 | 7/2002 | O'Brien |
| 2002/0097031 A1 | 7/2002 | Cook et al. |
| 2002/0116619 A1 | 7/2002 | Maruyama et al. |
| 2002/0171525 A1 | 11/2002 | Kobayashi et al. |
| 2002/0182898 A1 | 12/2002 | Takahashi et al. |
| 2002/0189910 A1 | 12/2002 | Yano et al. |
| 2003/0005289 A1 | 1/2003 | Gougeon et al. |
| 2003/0040897 A1 | 2/2003 | Murphy et al. |
| 2003/0074489 A1 | 4/2003 | Steger et al. |
| 2003/0094855 A1 | 5/2003 | Lohr et al. |
| 2003/0105601 A1* | 6/2003 | Kobayashi .......... G01R 31/3648 702/63 |
| 2003/0137277 A1* | 7/2003 | Mori .................. G01R 31/3648 320/132 |
| 2003/0166397 A1 | 9/2003 | Aura |
| 2003/0202330 A1 | 10/2003 | Lopata et al. |
| 2003/0204756 A1 | 10/2003 | Ransom et al. |
| 2005/0001589 A1 | 1/2005 | Edington et al. |
| 2005/0019143 A1 | 1/2005 | Bishman |
| 2005/0091432 A1 | 4/2005 | Adams et al. |
| 2005/0102535 A1 | 5/2005 | Patrick et al. |
| 2005/0144437 A1 | 6/2005 | Ransom et al. |
| 2005/0144440 A1 | 6/2005 | Catherman et al. |
| 2005/0162019 A1 | 7/2005 | Masciarelli et al. |
| 2005/0182876 A1 | 8/2005 | Kim et al. |
| 2005/0189910 A1 | 9/2005 | Hui |
| 2005/0229004 A1 | 10/2005 | Callaghan |
| 2006/0020782 A1 | 1/2006 | Kakii |
| 2006/0108972 A1 | 5/2006 | Araya |
| 2006/0119315 A1 | 6/2006 | Sasaki et al. |
| 2006/0155990 A1 | 7/2006 | Katsube et al. |
| 2006/0156415 A1 | 7/2006 | Rubinstein et al. |
| 2007/0072442 A1 | 3/2007 | DiFonzo et al. |
| 2007/0076768 A1 | 4/2007 | Chiesa et al. |
| 2007/0123316 A1 | 5/2007 | Little |
| 2007/0143838 A1 | 6/2007 | Milligan et al. |
| 2007/0177298 A1 | 6/2007 | Jaatinen et al. |
| 2007/0174524 A1 | 7/2007 | Kato et al. |
| 2007/0194944 A1 | 8/2007 | Galera et al. |
| 2007/0214296 A1 | 9/2007 | Takamatsu et al. |
| 2007/0229302 A1 | 10/2007 | Penick et al. |
| 2007/0260897 A1 | 11/2007 | Cochran et al. |
| 2008/0067874 A1 | 3/2008 | Tseng |
| 2008/0077976 A1 | 3/2008 | Schulz |
| 2008/0123669 A1 | 5/2008 | Oliveti et al. |
| 2008/0140888 A1 | 6/2008 | Blair et al. |
| 2008/0181316 A1 | 7/2008 | Crawley et al. |
| 2008/0189441 A1 | 8/2008 | Jundt et al. |
| 2008/0194124 A1 | 8/2008 | Di Stefano |
| 2008/0303351 A1 | 12/2008 | Jansen et al. |
| 2009/0036164 A1 | 2/2009 | Rowley |
| 2009/0061678 A1 | 3/2009 | Minoo et al. |
| 2009/0066291 A1 | 3/2009 | Tien et al. |
| 2009/0083843 A1 | 3/2009 | Wilkinson, Jr. et al. |
| 2009/0091513 A1 | 4/2009 | Kuhn |
| 2009/0092248 A1 | 4/2009 | Rawson |
| 2009/0121704 A1 | 5/2009 | Shibahara |
| 2009/0204458 A1 | 8/2009 | Wiese et al. |
| 2009/0217043 A1 | 8/2009 | Metke et al. |
| 2009/0222885 A1 | 9/2009 | Batke et al. |
| 2009/0234998 A1 | 9/2009 | Kuo |
| 2009/0239468 A1 | 9/2009 | He et al. |
| 2009/0245245 A1 | 10/2009 | Malwankar et al. |
| 2009/0254655 A1 | 10/2009 | Kidwell et al. |
| 2009/0256717 A1 | 10/2009 | Iwai |
| 2009/0278509 A1 | 11/2009 | Boyles et al. |
| 2009/0287321 A1 | 11/2009 | Lucas et al. |
| 2009/0288732 A1 | 11/2009 | Gielen |
| 2010/0052428 A1 | 3/2010 | Imamura et al. |
| 2010/0066340 A1 | 3/2010 | Delforge |
| 2010/0082869 A1 | 4/2010 | Lloyd et al. |
| 2010/0122081 A1 | 5/2010 | Sato et al. |
| 2010/0149997 A1 | 6/2010 | Law et al. |
| 2010/0151816 A1 | 6/2010 | Besehanic et al. |
| 2010/0153751 A1 | 6/2010 | Tseng et al. |
| 2010/0233889 A1 | 9/2010 | Kiani et al. |
| 2010/0262312 A1 | 10/2010 | Kubota et al. |
| 2011/0010016 A1 | 1/2011 | Giroti |
| 2011/0066309 A1 | 3/2011 | Matsuoka et al. |
| 2011/0074349 A1 | 3/2011 | Ghovanloo |
| 2011/0080056 A1 | 4/2011 | Low et al. |
| 2011/0082621 A1 | 4/2011 | Berkobin et al. |
| 2011/0089900 A1 | 4/2011 | Hogari |
| 2011/0140538 A1 | 6/2011 | Jung et al. |
| 2011/0185196 A1 | 7/2011 | Asano et al. |
| 2011/0196997 A1 | 8/2011 | Ruberg et al. |
| 2011/0197009 A1 | 8/2011 | Agrawal |
| 2011/0202992 A1 | 8/2011 | Xiao et al. |
| 2011/0285847 A1 | 11/2011 | Riedel et al. |
| 2011/0291491 A1 | 12/2011 | Lemmens et al. |
| 2011/0296066 A1 | 12/2011 | Xia |
| 2011/0313547 A1 | 12/2011 | Hernandez et al. |
| 2012/0028498 A1 | 2/2012 | Na et al. |
| 2012/0053742 A1 | 3/2012 | Tsuda |
| 2012/0102334 A1 | 4/2012 | O'Loughlin et al. |
| 2012/0124373 A1 | 5/2012 | Dangoor et al. |
| 2012/0143586 A1 | 6/2012 | Vetter et al. |
| 2012/0159210 A1* | 6/2012 | Hosaka ................ G06F 1/3212 713/320 |
| 2012/0236769 A1 | 9/2012 | Powell et al. |
| 2012/0242459 A1 | 9/2012 | Lambert |
| 2012/0265361 A1 | 10/2012 | Billingsley et al. |
| 2012/0271576 A1 | 10/2012 | Kamel et al. |
| 2012/0274273 A1 | 11/2012 | Jacobs et al. |
| 2012/0282805 A1 | 11/2012 | Ku et al. |
| 2012/0284354 A1 | 11/2012 | Mukundan et al. |
| 2012/0295451 A1 | 11/2012 | Hyun-Jun et al. |
| 2012/0297101 A1 | 11/2012 | Neuparti et al. |
| 2012/0311071 A1 | 12/2012 | Karaffa et al. |
| 2013/0011719 A1 | 1/2013 | Yasui et al. |
| 2013/0026973 A1 | 1/2013 | Luke et al. |
| 2013/0031382 A1 | 1/2013 | Jau et al. |
| 2013/0070788 A1 | 3/2013 | Deiretsbacher et al. |
| 2013/0170258 A1 | 7/2013 | Calvin et al. |
| 2013/0173832 A1 | 7/2013 | Calvin et al. |
| 2013/0211547 A1 | 8/2013 | Buchdunger et al. |
| 2013/0212390 A1 | 8/2013 | Du et al. |
| 2013/0224048 A1 | 8/2013 | Gillingwater et al. |
| 2013/0233924 A1 | 9/2013 | Burns |
| 2013/0244062 A1 | 9/2013 | Teramoto et al. |
| 2013/0291085 A1 | 10/2013 | Chong et al. |
| 2014/0015488 A1 | 1/2014 | Despesse |
| 2014/0068712 A1 | 3/2014 | Frenkel et al. |
| 2014/0075186 A1 | 3/2014 | Austen |
| 2014/0091623 A1 | 4/2014 | Shippy et al. |
| 2014/0095867 A1 | 4/2014 | Smith et al. |
| 2014/0097672 A1 | 4/2014 | Takemura et al. |
| 2014/0129162 A1 | 5/2014 | Hallman et al. |
| 2014/0142725 A1 | 5/2014 | Boyd |
| 2014/0280520 A1 | 9/2014 | Beier et al. |
| 2014/0285318 A1 | 9/2014 | Audeon et al. |
| 2014/0312913 A1 | 10/2014 | Kikuchi et al. |
| 2014/0327318 A1 | 11/2014 | Calvin et al. |
| 2014/0335703 A1 | 11/2014 | Calvin et al. |
| 2014/0341220 A1 | 11/2014 | Lessmann |
| 2015/0046701 A1 | 2/2015 | Rooyakkers et al. |
| 2015/0048684 A1 | 2/2015 | Rooyakkers et al. |

(56) References Cited

U.S. PATENT DOCUMENTS

| | | | |
|---|---|---|---|
| 2015/0115711 A1* | 4/2015 | Kouroussis | H02J 9/061 307/23 |
| 2015/0365240 A1 | 12/2015 | Callaghan | |
| 2016/0065656 A1 | 3/2016 | Patin et al. | |
| 2016/0069174 A1 | 3/2016 | Cannan et al. | |
| 2016/0172635 A1 | 6/2016 | Stimm et al. | |
| 2016/0224048 A1* | 8/2016 | Rooyakkers | G05F 1/66 |
| 2016/0301695 A1 | 10/2016 | Trivelpiece et al. | |
| 2018/0190427 A1 | 7/2018 | Rooyakkers et al. | |

FOREIGN PATENT DOCUMENTS

| | | |
|---|---|---|
| CN | 1440254 A | 9/2003 |
| CN | 1571335 A | 1/2005 |
| CN | 1702582 A | 11/2005 |
| CN | 1839581 A | 9/2006 |
| CN | 101005359 A | 7/2007 |
| CN | 101069407 A | 11/2007 |
| CN | 101262401 A | 9/2008 |
| CN | 101322089 A | 12/2008 |
| CN | 101447861 A | 6/2009 |
| CN | 101533380 A | 9/2009 |
| CN | 101576041 A | 11/2009 |
| CN | 201515041 U | 6/2010 |
| CN | 101809557 A | 8/2010 |
| CN | 101919139 A | 12/2010 |
| CN | 101977104 A | 2/2011 |
| CN | 102035220 A | 4/2011 |
| CN | 102237680 A | 11/2011 |
| CN | 202205977 U | 4/2012 |
| CN | 102480352 A | 5/2012 |
| CN | 1934766 B | 6/2012 |
| CN | 102546707 A | 7/2012 |
| CN | 102809950 A | 12/2012 |
| CN | 102812578 A | 12/2012 |
| CN | 103682883 A | 3/2014 |
| CN | 103376766 A | 4/2014 |
| CN | 103701919 A | 4/2014 |
| CN | 104025387 A | 9/2014 |
| CN | 203932181 U | 11/2014 |
| CN | 104185969 A | 12/2014 |
| CN | 204243110 U | 4/2015 |
| CN | 105556762 A | 5/2016 |
| CN | 104025387 B | 7/2018 |
| DE | 102013213550 A1 | 1/2015 |
| EP | 0473336 A2 | 3/1992 |
| EP | 0507360 A2 | 10/1992 |
| EP | 1176616 A2 | 1/2002 |
| EP | 1241800 A1 | 9/2002 |
| EP | 1246563 A1 | 10/2002 |
| EP | 1571559 A1 | 9/2005 |
| EP | 1877915 A2 | 1/2008 |
| EP | 1885085 A1 | 2/2008 |
| EP | 1885085 B1 | 2/2008 |
| EP | 2179364 A2 | 4/2010 |
| EP | 2317743 A1 | 5/2011 |
| EP | 2450921 A1 | 5/2012 |
| EP | 2557657 A2 | 2/2013 |
| EP | 2557670 A2 | 2/2013 |
| EP | 2613421 A1 | 7/2013 |
| EP | 2777796 A1 | 9/2014 |
| EP | 2806319 A2 | 11/2014 |
| JP | 559-074413 | 5/1984 |
| JP | 59-177226 | 11/1984 |
| JP | 4-245411 A | 9/1992 |
| JP | H1189103 A | 3/1993 |
| JP | H0163190 U | 12/1993 |
| JP | H05346809 A | 12/1993 |
| JP | H07105328 A | 4/1995 |
| JP | 07-320963 A | 12/1995 |
| JP | 08-037121 | 2/1996 |
| JP | 08-37121 | 2/1996 |
| JP | 08-098274 A | 4/1996 |
| JP | H0898274 A | 4/1996 |
| JP | H08241824 A | 9/1996 |
| JP | H08322252 A | 12/1996 |
| JP | H09182324 A | 7/1997 |
| JP | 11-098707 A | 4/1999 |
| JP | 11-23504 A | 8/1999 |
| JP | H11235044 A | 8/1999 |
| JP | H11312013 A | 11/1999 |
| JP | 2000252143 A | 9/2000 |
| JP | 2001292176 A | 10/2001 |
| JP | 2001307055 A | 11/2001 |
| JP | 2002280238 A | 9/2002 |
| JP | 2002343655 A | 11/2002 |
| JP | 2002359131 A | 12/2002 |
| JP | 3370931 B2 | 1/2003 |
| JP | 2003047912 A | 2/2003 |
| JP | 2003068543 A | 3/2003 |
| JP | 2003142327 A | 5/2003 |
| JP | 2003152703 A | 5/2003 |
| JP | 2003152708 A | 5/2003 |
| JP | 2003216237 A | 7/2003 |
| JP | 2004501540 A | 1/2004 |
| JP | 2004303701 A | 10/2004 |
| JP | 2005038411 A | 2/2005 |
| JP | 2005513956 A | 5/2005 |
| JP | 2005250833 A | 9/2005 |
| JP | 2005275777 A | 10/2005 |
| JP | 2005531235 A | 10/2005 |
| JP | 2005327231 A | 11/2005 |
| JP | 2005332406 A | 12/2005 |
| JP | 2006060779 A | 3/2006 |
| JP | 2006180460 A | 7/2006 |
| JP | 2006223950 A | 8/2006 |
| JP | 2006238274 A | 9/2006 |
| JP | 2007034711 A | 2/2007 |
| JP | 2007096817 A | 4/2007 |
| JP | 2007519150 A | 7/2007 |
| JP | 2007252081 A | 9/2007 |
| JP | 2008215028 A | 9/2008 |
| JP | 2008257707 A | 10/2008 |
| JP | 2008538668 A | 10/2008 |
| JP | 4245411 B2 | 3/2009 |
| JP | 2007238696 A | 7/2009 |
| JP | 2009157913 A | 7/2009 |
| JP | 2010503134 A | 1/2010 |
| JP | 2010515407 A | 5/2010 |
| JP | 2010135903 A | 6/2010 |
| JP | 2011217037 A | 10/2011 |
| JP | 2011223544 A | 11/2011 |
| JP | 5013019 B1 | 8/2012 |
| JP | 2012190583 A | 10/2012 |
| JP | 2013021798 A | 1/2013 |
| JP | 2013170258 A | 9/2013 |
| JP | 2014507721 A | 3/2014 |
| JP | 2014080952 A | 5/2014 |
| JP | 2015023375 A | 2/2015 |
| JP | 2016512039 A | 4/2016 |
| JP | 6189479 B1 | 8/2017 |
| KR | 20020088540 A | 11/2002 |
| KR | 100807377 B1 | 2/2005 |
| KR | 20050014790 A | 2/2005 |
| KR | 20060034244 A | 4/2006 |
| KR | 100705380 B1 | 4/2007 |
| TW | 201310344 A | 3/2013 |
| WO | 2005070733 A1 | 8/2005 |
| WO | 2006059195 A1 | 6/2006 |
| WO | 2007041866 A1 | 4/2007 |
| WO | 2007148462 A1 | 12/2007 |
| WO | 2008083387 A2 | 7/2008 |
| WO | 2009032797 A2 | 3/2009 |
| WO | 2011104935 A1 | 9/2011 |
| WO | 2013033247 A1 | 3/2013 |
| WO | 2013102069 A1 | 7/2013 |
| WO | 2014179556 A1 | 11/2014 |
| WO | 2014179566 A1 | 11/2014 |
| WO | 2015020633 A1 | 2/2015 |

(56) References Cited

OTHER PUBLICATIONS

Office Action for Chinese Application No. 201410802889.5, dated Jul. 26, 2018.
Fabien Fleuot, "Raspberry Pi + Mihini, Controlling an off-the-grid Electrical Installation, Part I," Apr. 11, 2014, XP055290314.
Generex Systems Gmbh, "BACS—Battery Analysis & Care System," Aug. 17, 2014, XP055290320.
Siemens, "Uninterruptible 24 V DC Power Supply High-Performance, communicative and integrated in TIA," Mar. 31, 2015, XP055290324.
Extended Search Report for European Application No. 16165112.0, dated Sep. 6, 2016.
Examination Report for European Application No. 16165112.0, dated Feb. 16, 2018.
Office Action for Candian Application No. 2875517, dated May 4, 2015.
Notice of Reason for Rejection for Japanese Application No. 2014-243827, dated Jan. 24, 2019.
Examinaion Report for European Application No. 16165112.0, dated Sep. 6, 2016.
Office Action for Chinese Application No. 2015103905202.2, dated Jun. 20, 2018.
Office Action for Chinese Application No. 2015103905202.2, dated Mar. 6, 2019.
Search Report for European Application No. 15175744,0, dated Apr. 26, 2016.
Office Action for Canadian Application No. 2,875,518, dated Jun. 3, 2015.
Office Action for Canadian Application No. 2,875,518, dated Apr. 22, 2016.
European Search Report for Ep Application No. 14196408.0, dated Nov. 24, 2015.
Office Action for Canadian Application No. 2,875,515, dated Jul. 5, 2017.
Office Action for Canadian Application No. 2,875,515, dated Feb. 10, 2017.
Office Action for Canadian Application No. 2,875,615, dated Jun. 1, 2016.
Office Action for Canadian Application No. 2,875,515, dated Oct. 6, 2016.
Office Action for Chinese Application No. 201410799473.2, dated Oct. 12, 2018.
Examination Report for European Application No. 14196409.8, dated Jan. 22, 2018.
Search Report for European Application No. 14196409.8, dated May 19, 2016.
Notice of Reason for Rejection for Japanese Application No, 2014-243830, dated Sep. 21, 2018.
Search Report for European Application No. 16154943.1, dated Jun. 17, 2016.
Partial European Search Report in European Application No. 17208183.8, dated Mar. 28, 2018.
Examination Report in European Application No. 17208183.8, dated Jun. 22, 2018.
Examination Report in European Application No. 17208183.8, dated Feb. 27, 2019.
Office Action for Chinese Appln. No. 201610239130.X, dated Feb. 14, 2018.
Office Action for Chinese Appln. No. 201610239130.X, dated Aug. 2, 2017.
Office Action for Chinese Application No. 201280065564.2, dated Aug. 3, 2016.
Office Action for Chinese Application No. 201280065564.2, dated Feb. 28, 2017.
Office Action for Chinese Application No. 201280065564.2, dated Oct. 19, 2017.
Partial Supplementary European Search Report in Application No. 12862174.5, dated Nov. 3, 2015.
European Search Report in Application No. 12862174.5, dated Feb. 15, 2016.
European Search Report in Application No. 17178867.2, dated Nov. 2, 2017.
Office Action for Japanese Application No. 2014-550508, dated Dec. 2, 2016.
Office Action for Japanese Application No. 2014-550508, dated Sep. 15, 2017.
International Search Report and Written Opinion for PCT/US2012/072056, dated Apr. 29, 2013.
Office Action for CN Appln. No. 201410182071.8, dated Mar. 1, 2017.
Office Action for Chinese Application No. 201410383686.7, dated May 31, 2017.
Office Action for Chinese Application No. 201410383686.7, dated Feb. 23, 2018.
Office Action for Chinese Application No. 201480034066.0, dated May 3, 2017.
Search Report and Opinion for European Application No. 14166908.8, dated Jan. 7, 2015.
Extended Search Report for European Application No. 14180106.8, dated Jul. 13, 2015.
Examination Report for European Application No. 14180106.8, dated Jun. 28, 2017.
Office Action for Japanese Application No. 2014-080952, dated May 2, 2018.
Office Action for Japanese Application No. 2014-080952, dated Jan. 7, 2019.
Office Action for Japanese Application No. 2014-159475, dated Jul. 18, 2018.
Office Action for Japanese Application No. 2014-159475, dated Feb. 15, 2019.
Office Action for Japanese Application No. 2016-512039, dated Jun. 5, 2018.
Office Action for Japanese Application No. 2016-512039, dated Feb. 5, 2019.
International Search Report and Written Opinion for PCT/US2014/036368, dated Sep. 12, 2014.
Office Action for Chinese Appln No. 201380079515.9, dated Nov. 16, 2017.
Office Action for Chinese Appln No. 201380079515,9 dated Aug. 7, 2018.
Office Action for Chinese Appin No, 201380079515,9, dated Feb. 25, 2019.
Supplementary Search Report in European Application No. 13890953,6, dated Jan. 26, 2017.
Office Action for Japanese Application No. 2016-533280, dated Jun. 28, 2017.
Office Action for Japanese Application No. 2016-533280, dated Apr. 11, 2018.
Office Action for Japanese Application No. 2016-533280, dated Jan. 7, 2019.
International Search Report and Written Opinion for PCT/US2013/053721, dated May 12, 2014.
Office Action for Chinese Appln No. 201380079514.4, dated Feb. 5, 2018.
Office Action for Chinese Appln No. 201380079514,4, dated Nov. 5, 2018.
Examination Report for European Application No. 13891327.2, dated Sep. 26, 2018.
Supplementary Search Report for European Application No. 13891327.2, dated Jan. 10, 2017.
Reason for Rejection in Japanese Patent Application No. 2016-533279, dated Aug. 13, 2018.
Notice of Reasons for Rejection in Japanese Patent Application No. 2016-533279, dated Jul. 13, 2017.
Notice of Reason for Rejection in Japanese Patent Application No. 2016-533279, dated Mar. 1, 2018.
"Introduction to Cryptography," Network Associates, Inc., PGP 6.5.1, 1990-1999, Retrieved @ (ftp://ftp.pgpi.org/pub/pgp/6.5/docs/english/IntroToCrypto.pdf) on Mar. 17, 2016, (refer to pp. 16-20).
Stouffer, et al. "Guide to Industrial Control Systems (ICS) Security," NIST, Special Pub. 800-82, Jun. 2011, (refer to pp. 2-1 to 2-10).

(56) References Cited

OTHER PUBLICATIONS

Rodrigues, A. et al., "Scada Security Device," Proceedings of the Seventh Annual Workshop on Cyber Security and Information Intelligence Research, CIISRW'11, Jan. 1, 2011, pp. 1-8, XP031538542.
Zafirovic-Vukotic, M. et al., "Secure Scada network supporting NERC CIP", Power & Energy Society General Meeting, 2009, PES '09, IEEE, Piscataway, NJ, USA, Jul. 26, 2009, pp. 1-8, XP031538542.
Roman Kleinerman; Daniel Feldman (May 2011), Power over Ethernet (PoE): An Energy-Efficient Alternative (PDF), Marvell, retrieved Sep. 9, 2018 @ http://www.marvell.com/switching/assets/Marvell-PoE-An-Energy-Efficient-Alternative.pdf (Year: 2011).
Molva, R. Ed et al., "Internet security architecture", Computer Networks, Elsevier Science Publishers B. V., Amsterdam, NL, vol. 31, No. 8, Apr. 23, 1999, pp. 787-804, XP004304518.
Rodrigues, A., "SCADA Security Device: Design and Implementation", Master of Science Thesis, Wichita State University, Dec. 2011.
CGI, White Paper on "Public Key Encryption and Digital Signature: How do they work?", 2004 (refer to pp. 3-4).
Baran, M.E. et al., "Overcurrent Protection on Voltage-Source-Converter-Based Multiterminal DC Distribution Systems," IEEE Transactions on Power Delivery, Jan. 2007.
European Search Report for European Application No. 14196406.4, dated Sep. 23, 2015.
European Search Report dated Dec. 2, 2015 for EP Application No. 14196408.0.
Examination Report for European Application No. 17178867.2, dated Mar. 13, 2019.
Examination Report for European Application No. 16165112.0, dated Apr. 17, 2019.
Examination Report for European Patent Application No. 16154943.1, dated May 16, 2019.
Extended European Search Report for Application No. EP14180106.8, dated Aug. 12, 2015.
Extended European Search Report for European Patent Application No. EP 14196409 dated May 31, 2016, 10 pages.
Extended European Search Report for European Patent Application No. EP 16154943 dated Jun. 29, 2016, 9 pages.
Extended European Search Report for European Patent Application No. EP 18176358 dated Sep. 11, 2018, 11 pages.
International Search Report for Application No. PCT/US2013/053721 dated May 12, 2014.
Notice of Reason for Rejection for Japanese Patent Application No. 2014-243830, dated Jul. 10, 2019.
Notice of Reason for Rejection for JP Patent Application No. 2018-109151, dated Jun. 25, 2019.
Office Action for Canadian Application No. 2,875,515, dated Feb. 17, 2016.
Office Action for Canadian Application No. 2,920,133, dated Jan. 30, 2017.
Office Action for Canadian Application No. 2,920,133, dated Oct. 19, 2016.
Office Action for Chinese Application No. 201510390520.2, dated Aug. 6, 2019.
Office Action dated May 17,2013 for U.S. Appl. No. 13/341,161.
Office Action for Chinese Patent Application 201410802889.5, dated May 7, 2019.
Office Action for Canadian Application No. 2,920,133, dated Apr. 14, 2016.
Office Action for Chinese Application No. 201410799952, dated Jul. 3, 2019.
Partial Search Report for European Application No. 15175744.0, dated Dec. 14, 2015.
Partial Supplementary European Search Report dated Nov. 10, 2015 in Application# EP12862174.5.
Search Report for European Application No. 14196406.4, dated Nov. 4, 2015.
Siemens AG: "ERTEC 400 | Enhanced Real-Time Ethernet Controller | Handbuch",No. Version 1.2.2 pp. 1-98, XP002637652, Retrieved from the Internet: URL:http:||cache.automation.siemens.com|dniiDU1 DUxNDgzNwAA_21631481_HBIERTEC400_Handbuch_V122.pdf [retrieved on May 2, 2011].
Supplementary Search Report for European Application No. 14791210.9, dated Dec. 6, 2016.
European search report for Europeant Patent Application No. EP14196406 dated Oct. 2, 2015, 6 pages.
Partial European Search Report for European Patent Application No. EP 15175744 dated Jan. 2016, 7 pages.
Supplementary European Search Report for European Patent Application No. EP 13890953 dated Feb. 6, 2017, 9 pages.
Decision of Rejection for Patent Application No. 2014-243827, dated Nov. 28, 2019.
Decision of Rejection for Chinese Application No. 201510390520.2, dated Nov. 5, 2019.
Examination Report for European Patent Application No, 1720883.8, dated Oct. 29, 2019.
Notice of Reason for Rejection for Patent Application No. 2016-021763, dated Nov. 27, 2019.
Office Action for Chinese Patent Application No. 201610236358.3, dated Sep. 4, 2019.
Office Action for Chinese Patent Application 201410802889.5, dated Dec. 4, 2019.
Office Action fom Chinese Patent Application No, 201610229230,4, dated Oct. 24, 2019.
Office Action from EP Application No. 14196406.4, dated Jul. 29, 2019.
Office Action for Japanese Application No. 2015-136186, dated Oct. 10, 2019.

* cited by examiner

SECURE POWER SUPPLY FOR AN INDUSTRIAL CONTROL SYSTEM

CROSS-REFERENCE TO RELATED APPLICATIONS

The present application claims the benefit under 35 U.S.C. § 119(e) of U.S. Provisional Patent Application No. 62/146,796, filed Apr. 13, 2015, and titled "POWER SUPPLY SYSTEM". The present application is also a continuation-in-part of U.S. Non-Provisional patent application Ser. No. 14/519,032, filed Oct. 20, 2014, and titled "SECURE POWER SUPPLY FOR AN INDUSTRIAL CONTROL SYSTEM." U.S. Non-Provisional patent application Ser. No. 14/519,032 claims the benefit under 35 U.S.C. § 119(e) of U.S. Provisional Patent Application No. 61/940,003, filed Feb. 14, 2014, and titled "BACKUP POWER SUPPLY." U.S. Non-Provisional patent application Ser. No. 14/519,032 is also a continuation-in-part of International Application No. PCT/US2013/053721, filed Aug. 6, 2013, and titled, "SECURE INDUSTRIAL CONTROL SYSTEM." U.S. Non-Provisional patent application Ser. No. 14/519,032 is also a continuation-in-part of U.S. Non-Provisional patent application Ser. No. 14/469,931, filed Aug. 27, 2014, and titled "SECURE INDUSTRIAL CONTROL SYSTEM." U.S. Non-Provisional patent application Ser. No. 14/519,032 is also a continuation-in-part of U.S. Non-Provisional patent application Ser. No. 14/446,412, filed Jul. 30, 2014, and titled "INDUSTRIAL CONTROL SYSTEM CABLE," which claims priority under 35 U.S.C. § 119(e) of U.S. Provisional Patent Application No. 62/021,438, filed Jul. 7, 2014, and titled "INDUSTRIAL CONTROL SYSTEM CABLE." The aforementioned Provisional and Non-Provisional patent applications are all incorporated herein by reference in their entireties.

BACKGROUND

Industrial control systems, such as standard industrial control systems (ICS) or programmable automation controllers (PAC), include various types of control equipment used in industrial production, such as supervisory control and data acquisition (SCADA) systems, distributed control systems (DCS), programmable logic controllers (PLC), and industrial safety systems certified to safety standards such as IEC1508. These systems are used in industries including electrical, water and wastewater, oil and gas production and refining, chemical, food, pharmaceuticals and robotics. Using information collected from various types of sensors to measure process variables, automated and/or operator-driven supervisory commands from the industrial control system can be transmitted to various actuator devices such as control valves, hydraulic actuators, magnetic actuators, electrical switches, motors, solenoids, and the like. These actuator devices collect data from sensors and sensor systems, open and close valves and breakers, regulate valves and motors, monitor the industrial process for alarm conditions, and so forth.

In other examples, SCADA systems can use open-loop control with process sites that may be widely separated geographically. These systems use Remote Terminal Units (RTUs) to send supervisory data to one or more control centers. SCADA applications that deploy RTU's include fluid pipelines, electrical distribution and large communication systems. DCS systems are generally used for real-time data collection and continuous control with high-bandwidth, low-latency data networks and are used in large campus industrial process plants, such as oil and gas, refining, chemical, pharmaceutical, food and beverage, water and wastewater, pulp and paper, utility power, and mining and metals. PLCs more typically provide Boolean and sequential logic operations, and timers, as well as continuous control and are often used in stand-alone machinery and robotics. Further, ICE and PAC systems can be used in facility processes for buildings, airports, ships, space stations, and the like (e.g., to monitor and control Heating, Ventilation, and Air Conditioning (HVAC) equipment and energy consumption). As industrial control systems evolve, new technologies are combining aspects of these various types of control systems. For instance, PACs can include aspects of SCADA, DCS, and PLCs.

SUMMARY

A power supply is disclosed for an industrial control system or any system including a distributed power supply network. The power supply includes a battery module including a battery cell and a battery monitor configured to monitor the battery cell. In embodiments, the power supply also has a self-hosted server operatively coupled with the battery module. The self-hosted server is configured to receive diagnostic information from the battery monitor and provide network access to the diagnostic information. In implementations, the diagnostics stored by the self-hosted server can be broadcast to or remotely accessed by enterprise control/monitoring systems, application control/monitoring systems, or other remote systems via a secured network (e.g., secured access cloud computing environment).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

Figure 2:
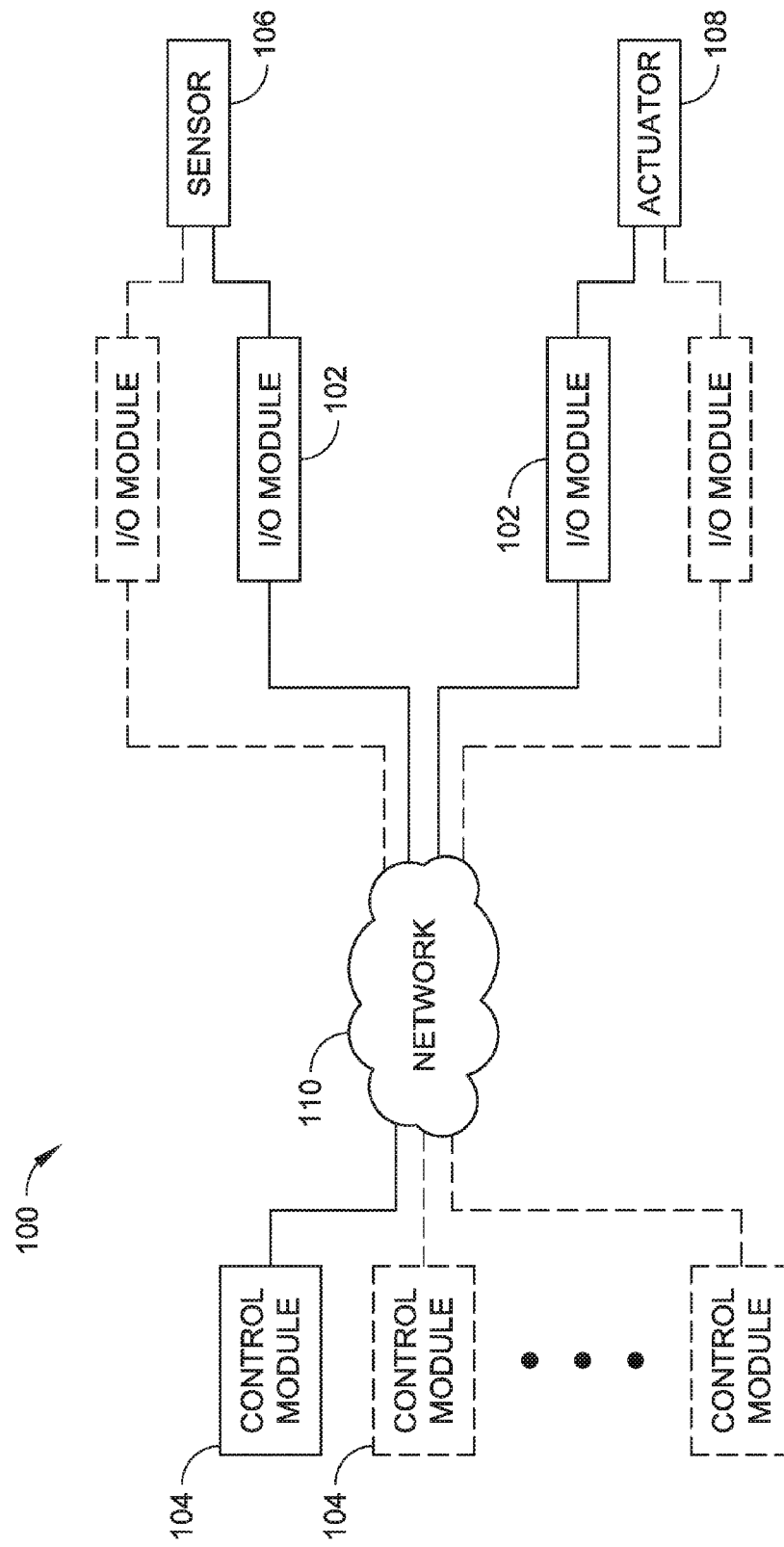
FIG. 2 is a block diagram illustrating an industrial control system in accordance with example embodiments of the present disclosure.
Figure 3:
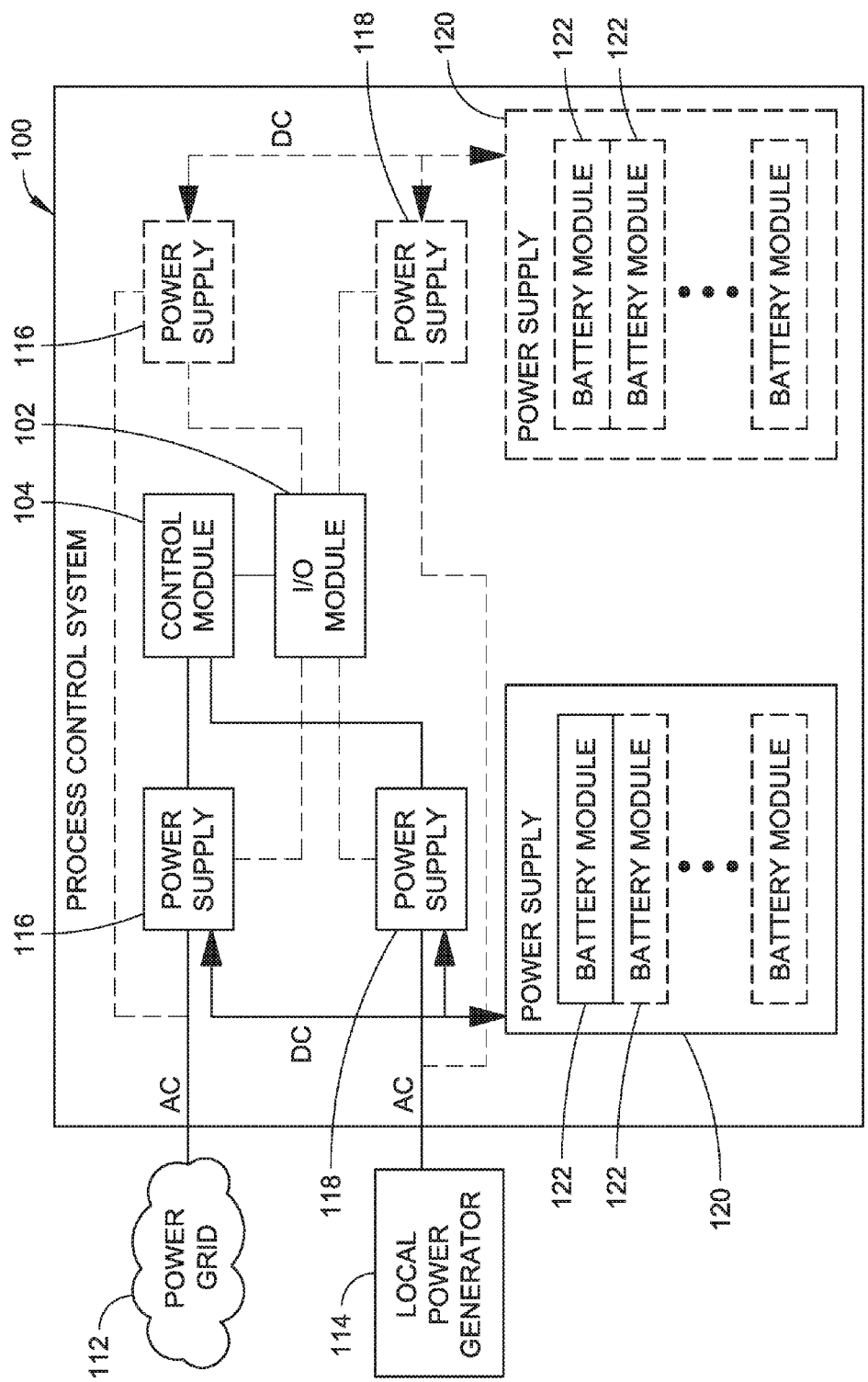

FIG. 3 is a block diagram illustrating an industrial control system, such as the industrial control system of FIG. 2, where the industrial control system receives electrical power from multiple sources, such as a power grid and one or more local power generators, and where one or more backup power supplies are configured to store and return electrical energy using multiple battery modules in accordance with example embodiments of the present disclosure.

Figure 4:
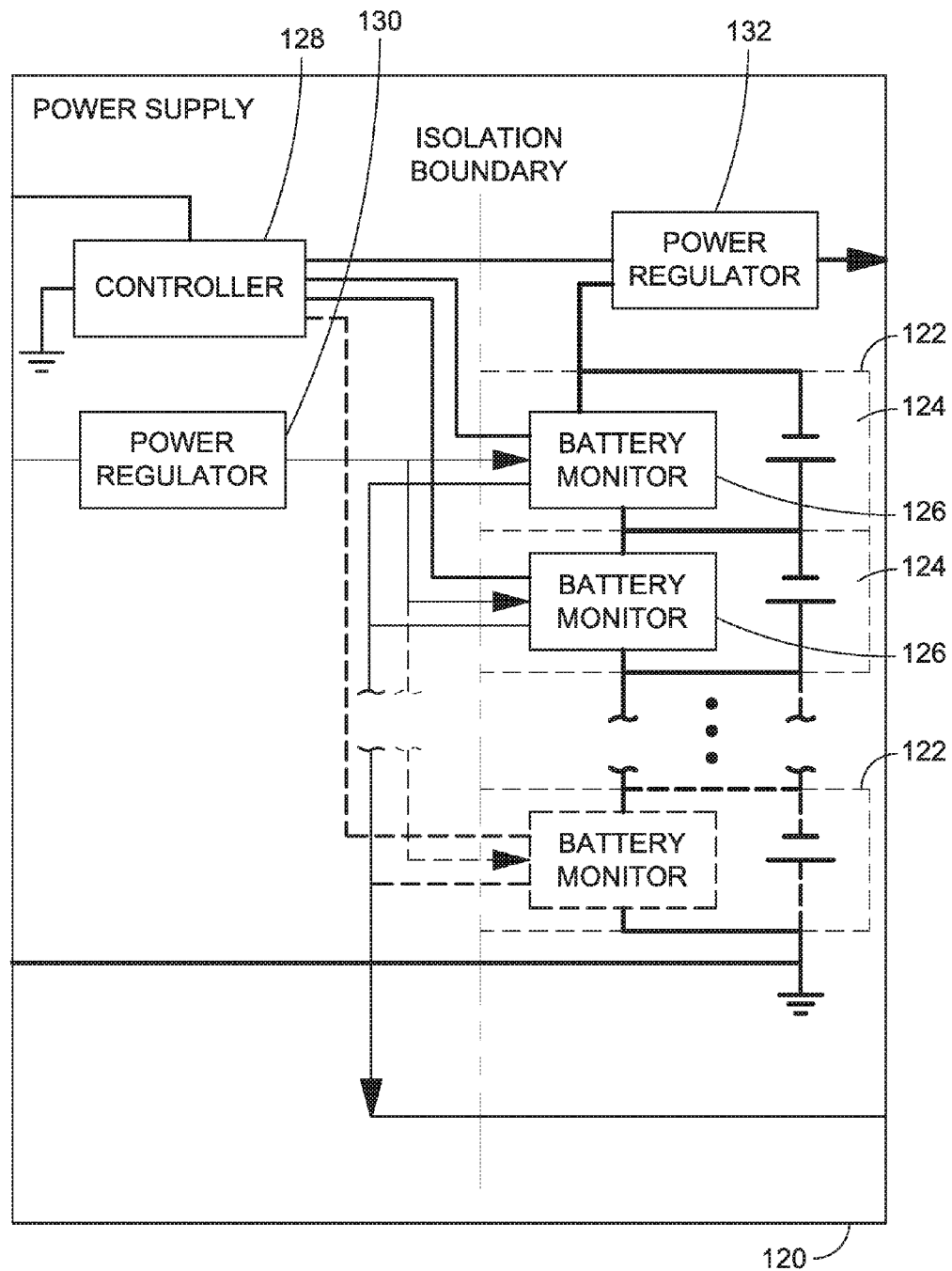

FIG. 4 is a block diagram illustrating a backup power supply configured to communicatively couple with a system, such as the industrial control system of FIG. 2, and configured to connect to an electrical power source (e.g., the power grid and/or local power generator of FIG. 2) to store and return electrical energy, where the backup power supply includes a controller and multiple battery modules, and each battery module has a battery monitor communicatively coupled with the controller in accordance with example embodiments of the present disclosure.

Figure 5:
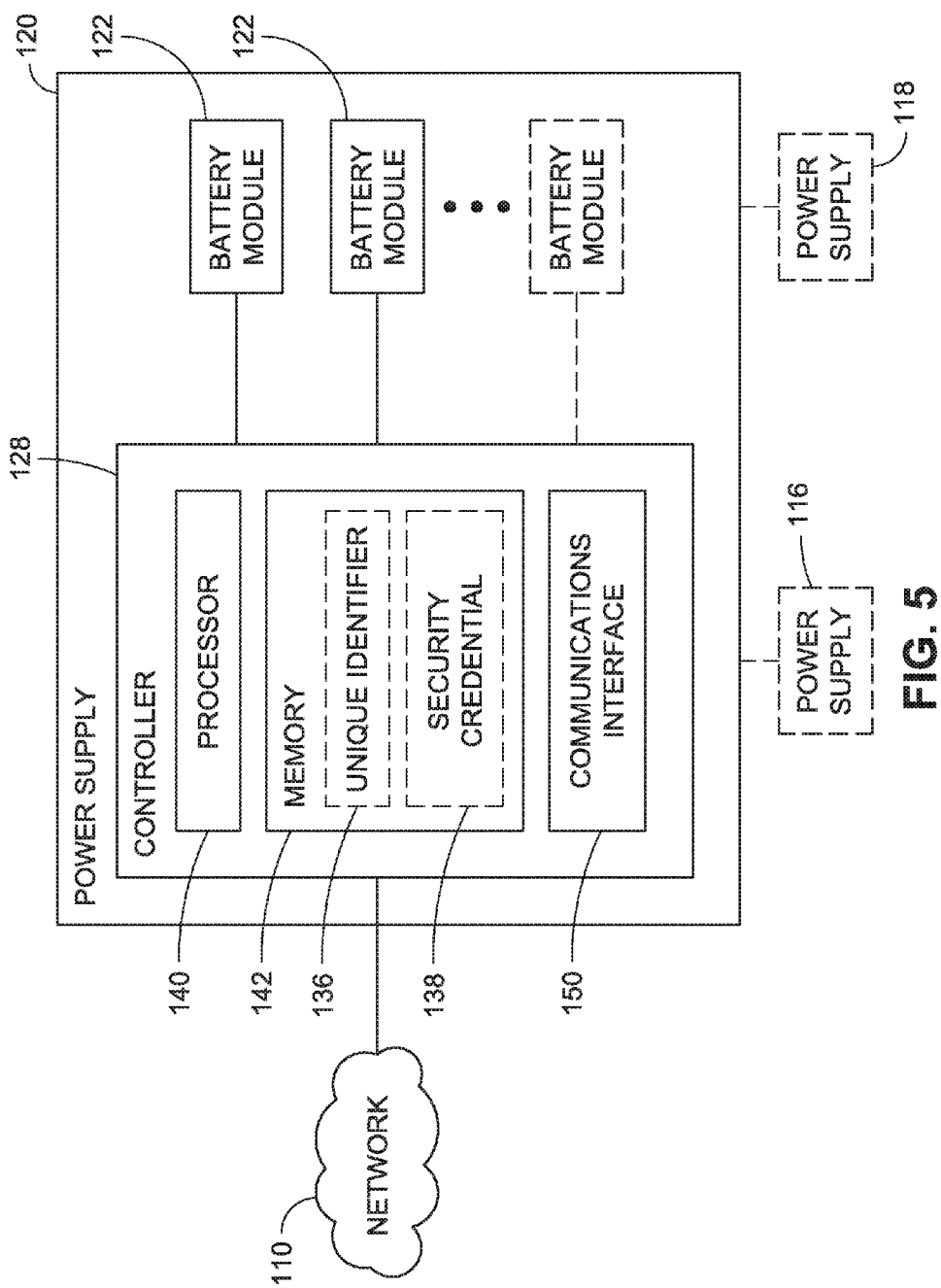

FIG. 5 is a block diagram illustrating a backup power supply, such as the backup power supply illustrated in FIG. 4, where the backup power supply is configured to communicatively couple with a system, such as the industrial control system of FIG. 2, and where the backup power supply includes a controller configured to provide the system with information regarding the status of multiple battery modules included with the backup power supply in accordance with example embodiments of the present disclosure.

Figure 1:
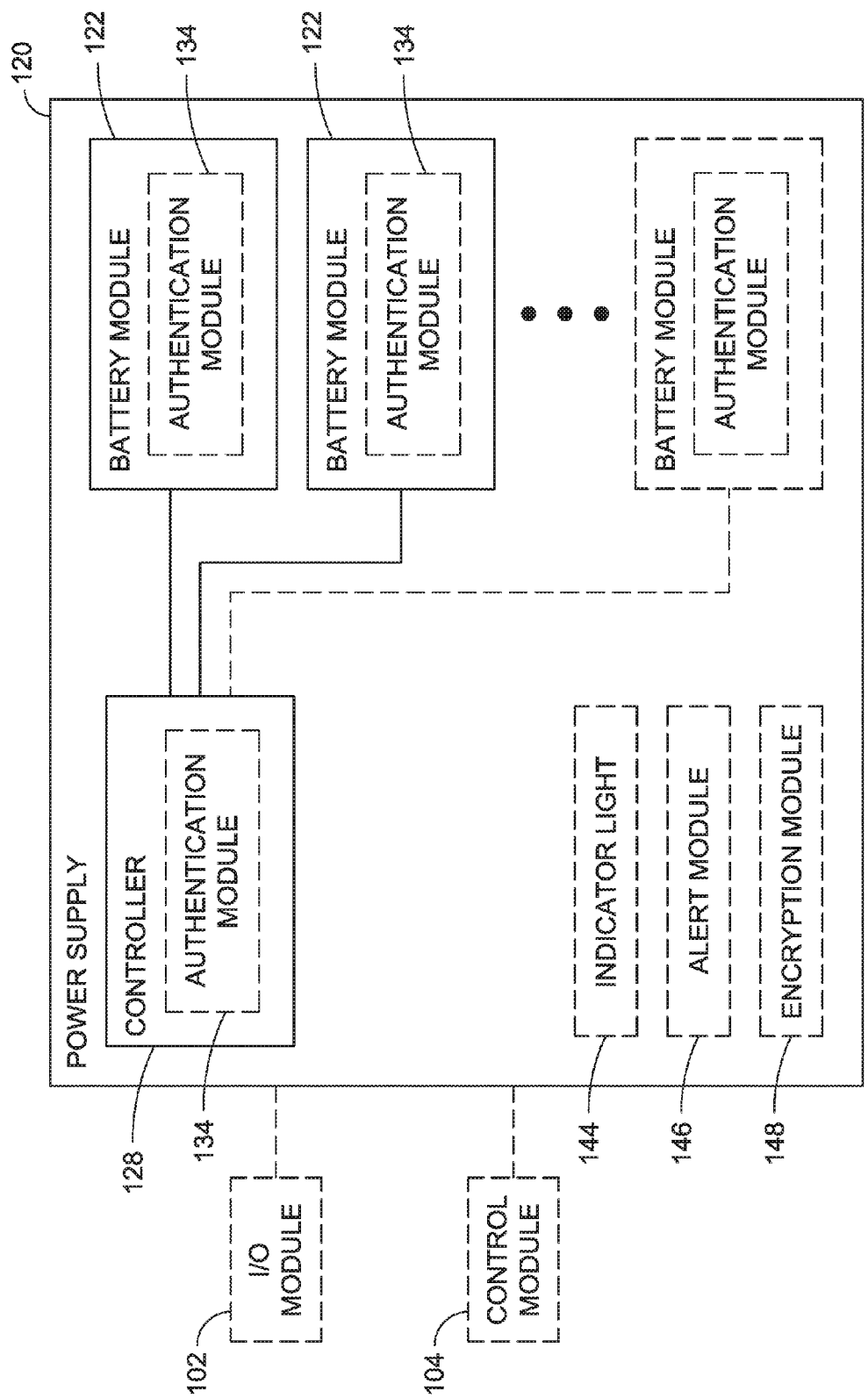
FIG. 1 is a block diagram illustrating a power supply that includes one or more authentication modules in accordance with example embodiments of the present disclosure.
Figure 6:
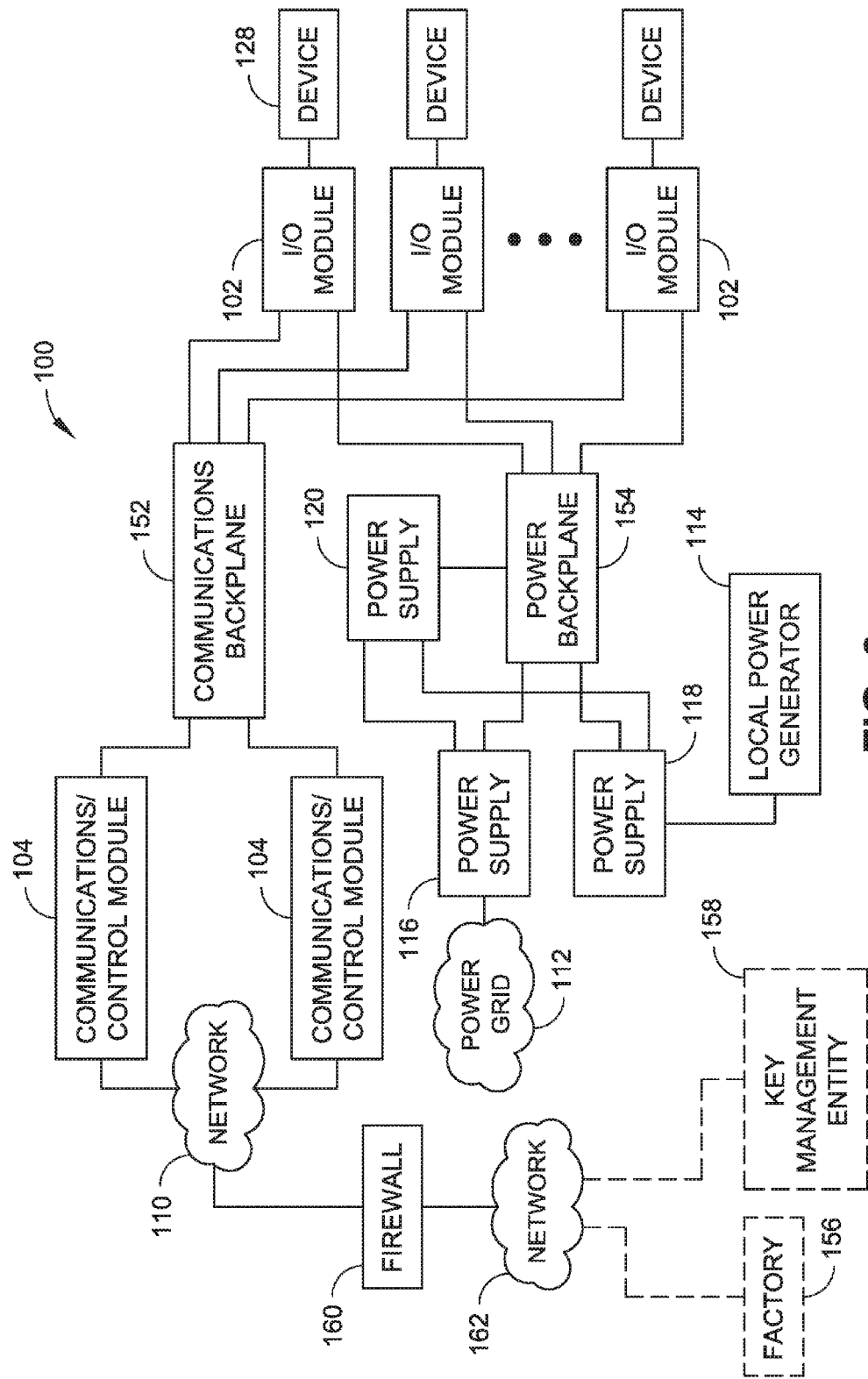

FIG. 6 is a diagrammatic illustration of a secure control system that authenticates devices, such as the power supply illustrated in FIG. 1 and/or other devices, such as powered devices connected to the power supply illustrated in FIG. 1, in accordance with example embodiments of the present disclosure.

Figure 7:
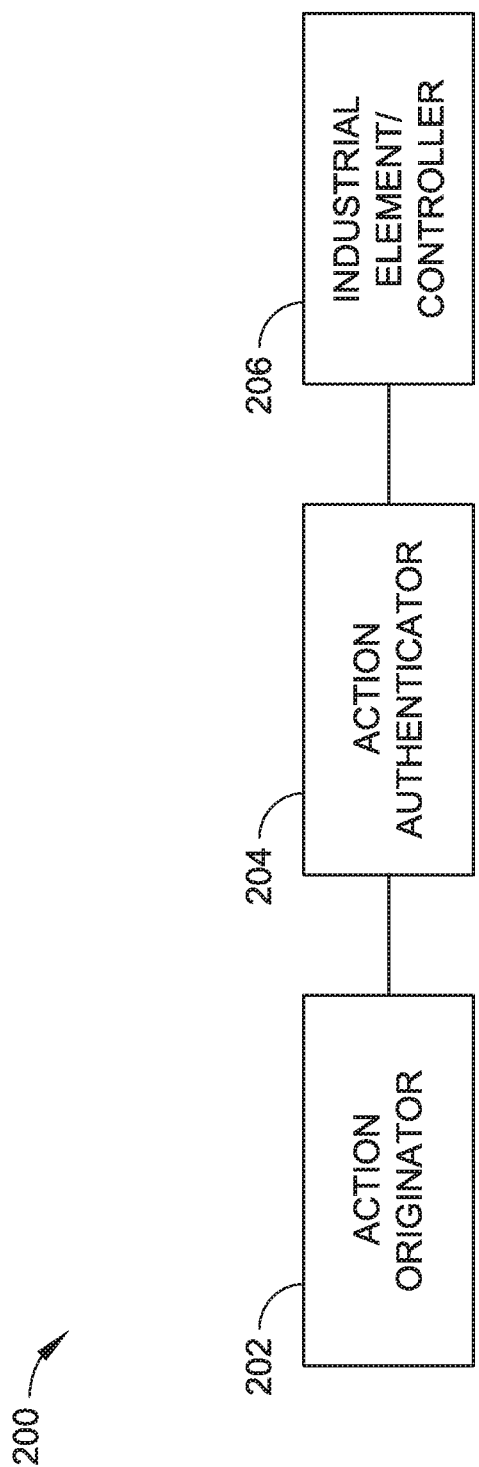

FIG. 7 is a block diagram illustrating an action authentication path for an industrial control system, such as the secure control system of FIG. 6, in accordance with example embodiments of the present disclosure.

Figure 8:
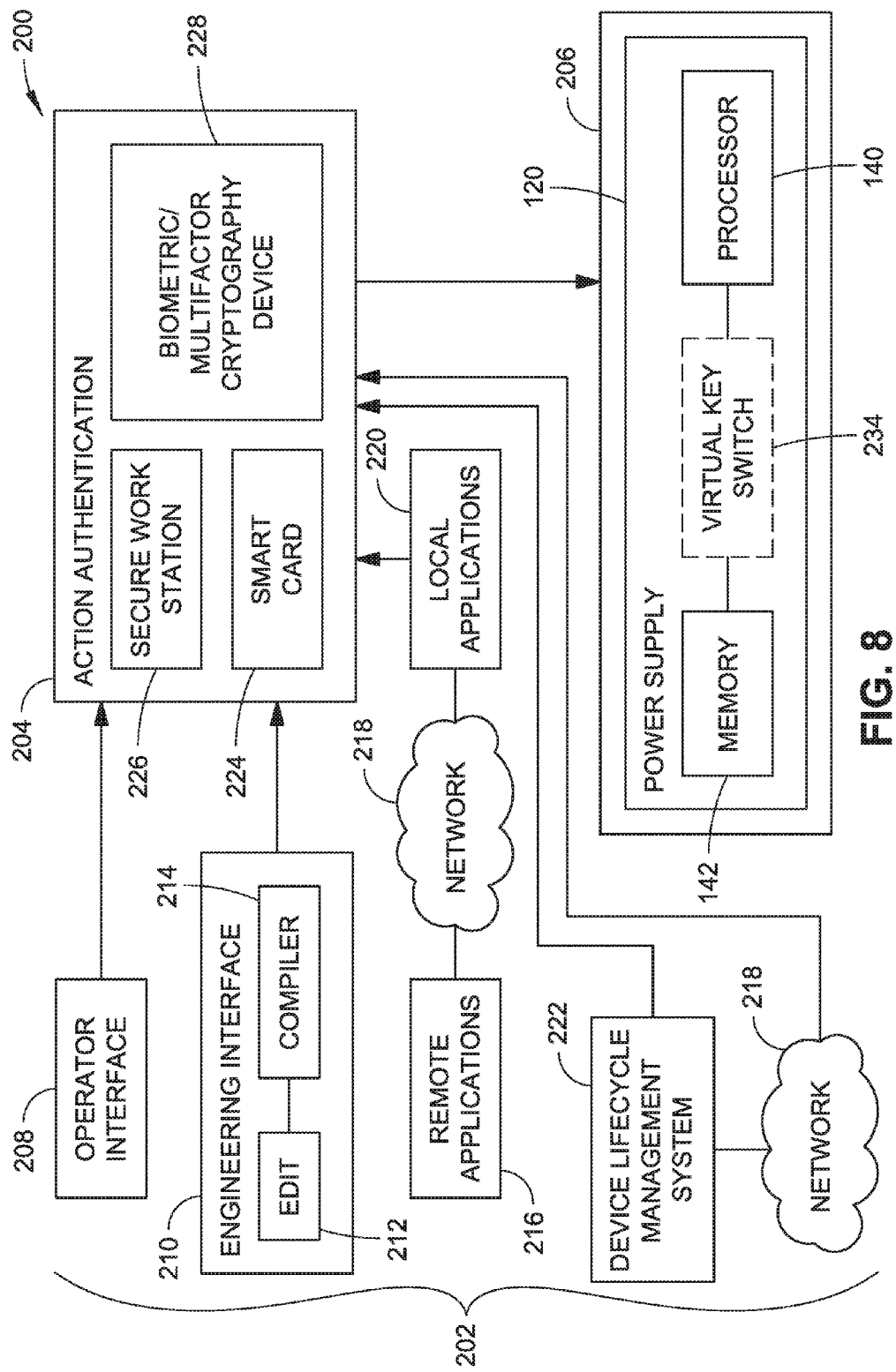

FIG. 8 is a block diagram further illustrating the action authentication path of FIG. 7 in accordance with example embodiments of the present disclosure.

Figure 9:
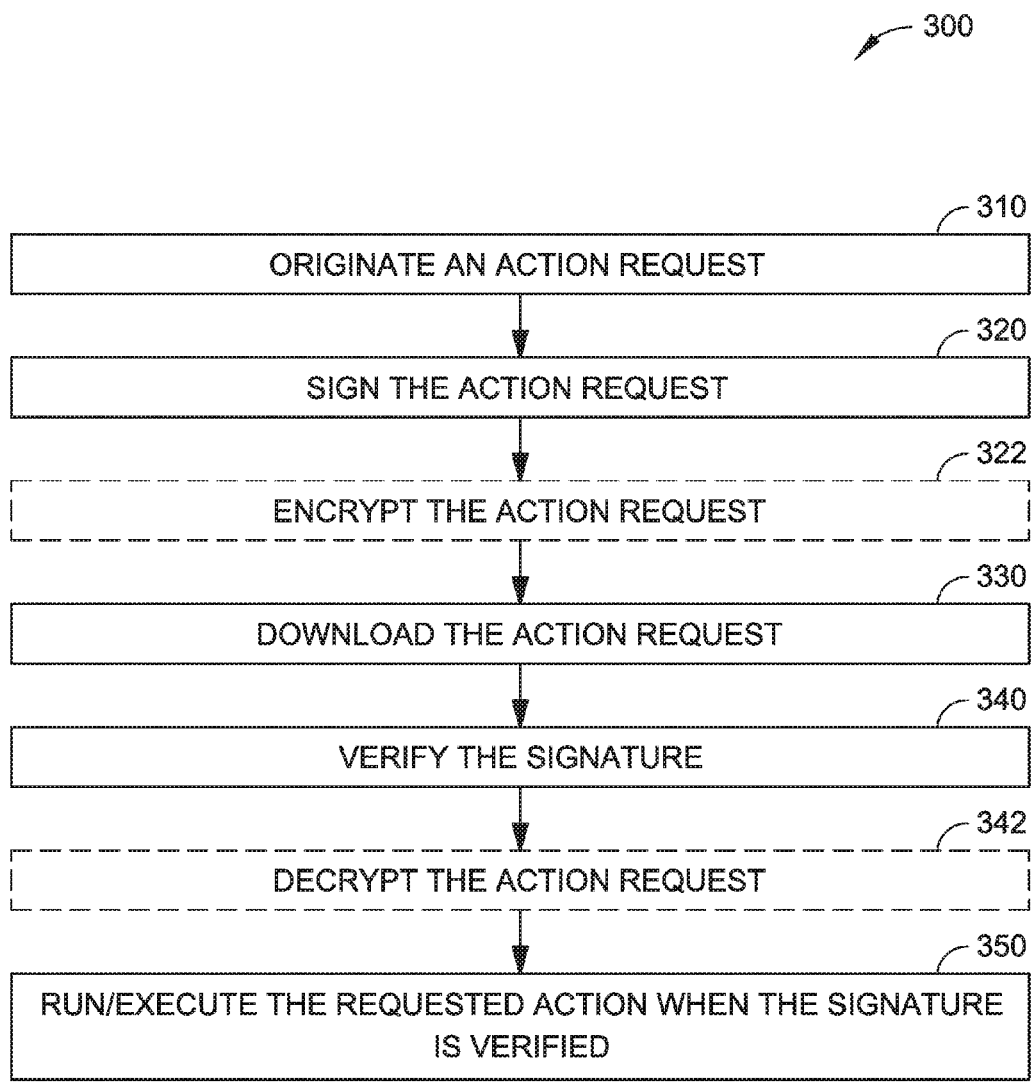

FIG. 9 is a flow diagram illustrating a method for authenticating an action request in accordance with example embodiments of the present disclosure.

Figure 10:
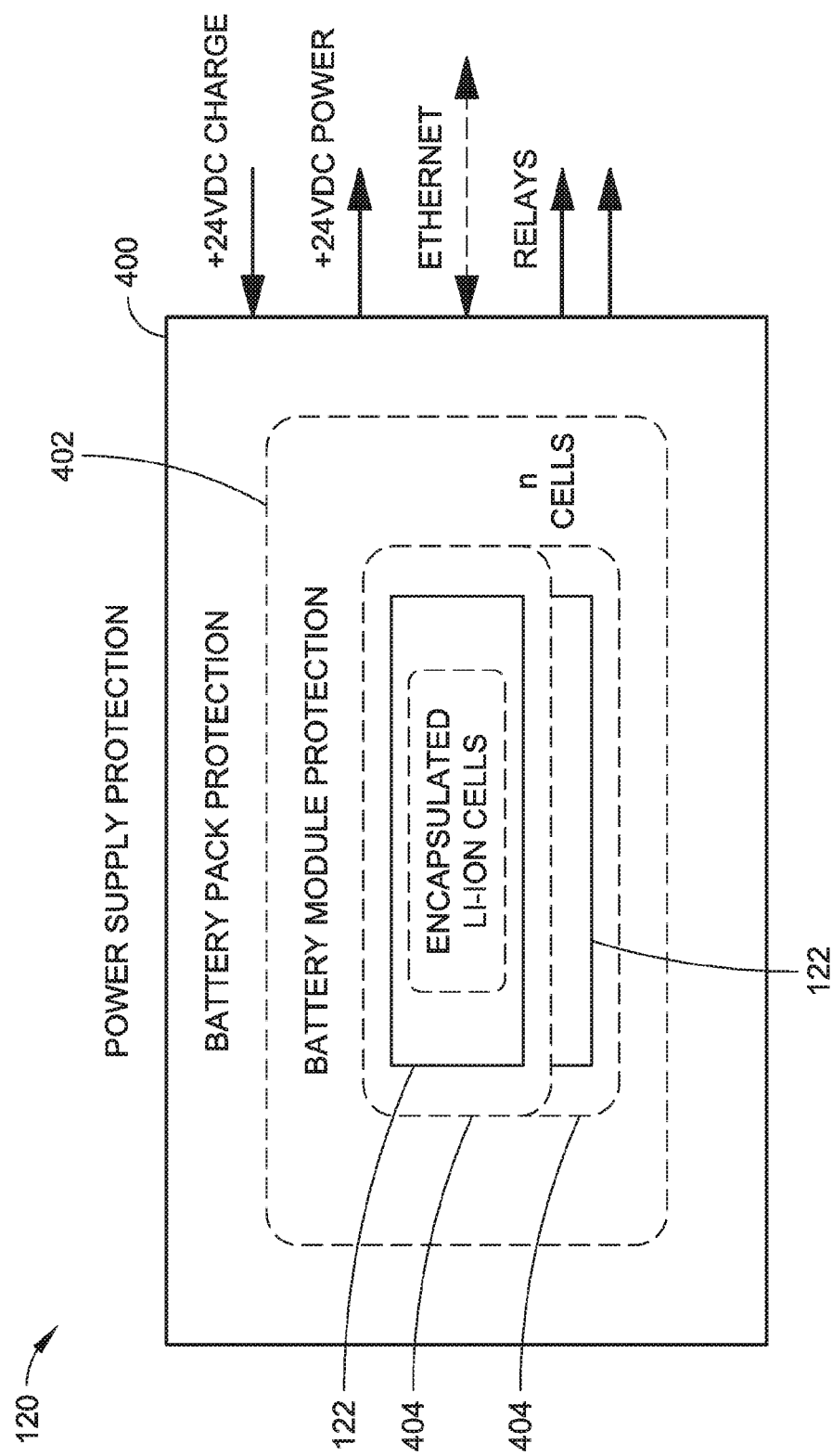

FIG. 10 is a block diagram illustrating a battery module in accordance with example embodiments of the present disclosure.

Figure 11:
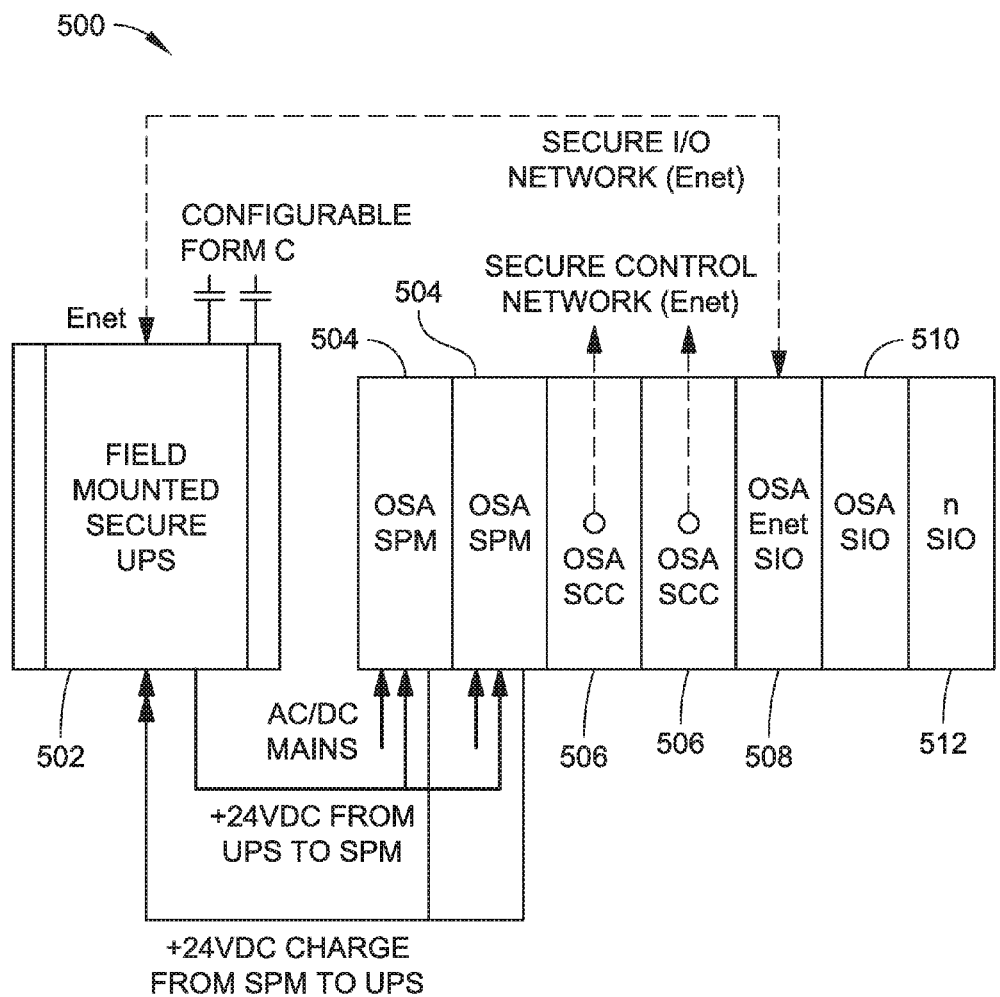

FIG. 11 is a block diagram illustrating connectivity between a power supply and industrial control system elements in accordance with example embodiments of the present disclosure.

Figure 12:
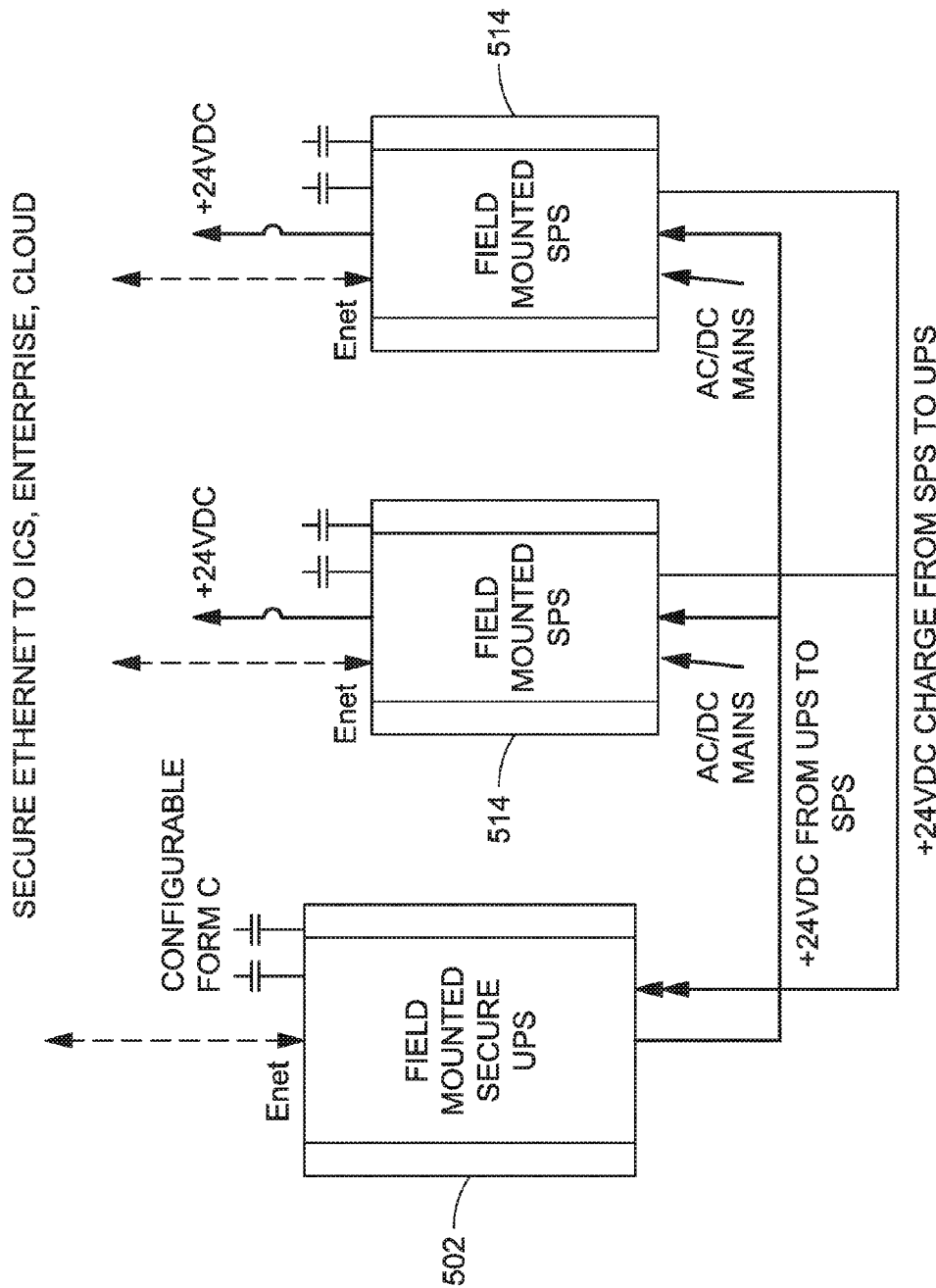

FIG. 12 is a block diagram illustrating connectivity between a first power supply and one or more redundant power supplies in accordance with example embodiments of the present disclosure.

DETAILED DESCRIPTION

Overview

In industrial control system settings, power is typically supplied to automation equipment such as controllers, input/output (I/O) modules, and so forth from a power grid (e.g., using high voltage power from AC mains), using local power generation (e.g., using on-site turbines and/or diesel power generators), and so on. Often, backup power is also supplied to automation equipment in these settings from batteries. For example, large scale battery storage can be provided in an industrial setting using, for instance, lead-acid batteries. Power from large scale battery storage can be supplied using centralized, alternating current (AC) power transmission techniques. In other examples, smaller, decentralized direct current (DC) battery supplies are used. For instance, backup battery power is supplied by smaller lead-acid batteries at the level of cabinets, controllers, I/O modules, and so forth. However, lead-acid batteries have a comparatively low energy density when compared to newer rechargeable battery technologies, such as lithium-ion batteries. Further, in these configurations, the backup batteries are generally separate from control hardware, requiring separate connections to each battery to monitor battery status. For example, backup batteries in industrial automation settings are typically connected to spare I/O ports of control hardware to monitor the activity (e.g., on/off status) of such batteries.

A power supply is disclosed for an industrial control system or any system including a distributed power supply network. The power supply includes a battery module including a battery cell and a battery monitor configured to monitor the battery cell. In embodiments, the power supply also has a self-hosted server operatively coupled with the battery module. The self-hosted server is configured to receive diagnostic information from the battery monitor and provide network access to the diagnostic information. In implementations, the diagnostics stored by the self-hosted server can be broadcast to or remotely accessed by enterprise control/monitoring systems, application control/monitoring systems, or other remote systems via a secured network (e.g., secured access cloud computing environment). A power supply network can include a plurality of distributed power supplies. The distributed power supplies may be in communication with one another (e.g., via a network between respective servers).

An industrial control system can include at least one control module coupled to at least one input/output module that is controlled and monitored by the control module, where the input/output module is configured to receive input signals from a sensor or provide output signals for an actuator or motor. The control module and/or the input/output module can be coupled to a power module for furnishing power to the control module and/or the input/output module. In some embodiments, a first power module serves both of the control module and the input/output module. In other embodiments, a first power module serves the control module, and a second power module serves the input/output module. Further, it is understood that multiple control modules and/or multiple input/output modules can be implemented. The foregoing example are provided for explanatory purposes and should not be understood as limiting the system to a single control, input/output, or power module. The industrial control system can include one or more power supplies (e.g., a standalone power supply or a distributed network of power supplies) for distributing power to the power module(s).

Systems and techniques are also described herein that facilitate monitoring and/or control of battery supplies in industrial control system settings, such as uninterruptible power supply (UPS) equipment. The techniques and systems described can be implemented using higher energy density rechargeable battery technologies, such as lithium-ion rechargeable battery technologies. In embodiments of the disclosure, an industrial UPS furnishes communications and/or security features, such as bidirectional system communications, control system integration, cyber security integration, and so on. For example, an industrial UPS provides status information, diagnostic information, reliability information, bidirectional communications, and so forth. In some embodiments, an industrial UPS implements key encryption microcontroller techniques.

In some embodiments, a power supply includes circuitry (e.g., a printed circuit board (PCB), an integrated circuit (IC) chip, and/or other circuitry) that can perform an authentication of the power supply and/or a device connected to the power supply. This can prevent or minimize the potential for plugging a power supply into a device not intended to be used with that particular power supply or type of power supply (e.g., preventing or minimizing the possibility that a low voltage power supply is plugged into a high voltage device). For example, the power supply performs a "handshake" operation with a coupled module to verify that the power supply is mated with an appropriate and/or desired device. In some embodiments, an indicator, such as a light emitting diode (LED) indicator light, is used to provide notification of this authentication. For instance, a multi-colored LED and/or a single color LED provides diagnostic information to indicate the status of an authentication (e.g., using a solid glow, no glow, blinking, one color for one state and another color for another state, etc.).

In some embodiments, the power supply can be used to authenticate another device, such as an instrument that receives power from the power supply. For instance, power supply circuitry can be used to authenticate a powered device, a type of powered device, the manufacturer of a powered device, and so on. In this manner, the use of counterfeit equipment in an industrial automation setting can be prevented or minimized. Further, the power supply can be used to authenticate itself to equipment, such as controllers, input/output (I/O) modules, end devices, field devices (e.g., process sensors and/or actuators), and so forth. In some embodiments, the power supply facilitates cryptographic communication between the power supply and a device connected to the power supply. For example, a power supply can provide bi-directional cryptographic communications between the power supply and end devices, field devices, and so on. Further, in some embodiments, an operator can use a power supply connected to a network to obtain authentication information about a field device, such as a sensor, actuator or any other instrument. In some embodiments, two or more authentication modules (e.g., a first authentication module and a second authentication module) are configured to perform an authentication sequence (e.g., a "handshake") when a new device is installed, at startup/reset, periodically, at scheduled times, and/or other predefined events. Should the authentication modules fail to authenticate another device and/or one another, at least one of the devices (e.g., the unauthenticated device) can be partially or completely disabled and/or restricted from communicating with other devices.

In industrial control systems, various industrial elements/subsystems (e.g., input/output modules, power modules, field devices, switches, workstations, and/or physical interconnect devices) are controlled or driven by control elements/subsystems (e.g., one or more communications/control modules). The control elements/subsystems operate according to programming and action requests (e.g., executable software modules, control commands, data requests, and the like) received from an action originator, such as, but not necessarily limited to: an operator interface (e.g., a SCADA or human machine interface (HMI)), an engineering interface, a local application, a remote application, and so on. Where multiple action originators are present, the industrial control system can be vulnerable to unauthorized access to data and/or controls. Further, the industrial control system may be vulnerable to malware, spyware, or other corrupt/malicious software that can be transmitted in the form of an update, application image, control command, or the like. Simply authenticating the operator may not be enough to secure the system from malicious actors or even unintentionally unauthorized requests/commands that can be originated via a valid login or a seemingly valid (e.g., hacked) application or operator/engineering interface.

The present disclosure is directed to controllers, systems, and techniques for preventing unauthorized action requests from being processed in an industrial control system. A predefined selection of operations or all operator actions and/or other control actions or requests can be secured via an authentication path from an action originator to an industrial element/controller (e.g., communications/control module, input/output (I/O) module, power module, field device, switch, workstation, physical interconnect device, or the like). In implementations, the industrial control system requires an action authenticator to sign an action request generated by the action originator. Unsigned action requests may automatically result in an error and will not be processed or executed by the industrial element/controller. The industrial element/controller can be configured to receive the signed action request, verify the authenticity of the signed action request, and perform a requested action when the authenticity of the signed action request is verified. In this manner, malicious or otherwise unauthorized action requests are not processed, and thus the system can be protected from malware, spyware, unauthorized changes of control parameters, unauthorized access to data, and so forth.

Example Implementations

Referring generally to FIGS. 1 through 12, example power supplies are described in accordance with the present disclosure. In some embodiments, a power supply 120 includes one or more authentication modules 134 configured to authenticate the power supply 120 and/or one or more battery modules 122 of the power supply 120 to a device connected to the power supply 120, such as an I/O module 102, a control module 104, and so forth (e.g., as illustrated in FIG. 1). The authentication module 134 can also be used to authenticate one or more devices connected to the power supply 120. In some embodiments, the authentication module 134 stores a unique identifier 136 and/or a security credential 138 associated with the power supply 120 (e.g., as shown in FIG. 5, where an authentication module is implemented using a controller 128 including a processor 140 and a memory 142 that stores one or more unique identifiers 136 and/or security credentials 138). The authentication module 134 can be configured to establish and/or prevent connection to devices connected to the power supply 120 based upon the authentication. The power supply 120 can also include an indicator (e.g., an indicator light 144) to indicate the authentication (e.g., to an operator).

In some embodiments, the power supply 120 includes an alert module 146. In embodiments of the disclosure, the alert module 146 is configured to provide an alert (e.g., to an operator) when a condition and/or set of conditions is met for the power supply 120 and/or a device connected to the power supply 120. For example, an alert is generated by an authentication module 134 and provided by an alert module 146 when authentication of the power supply 120 and/or a device connected to the power supply is obtained and/or fails. For example, a power supply 120 performs a "handshake" operation with a coupled powered device (e.g., an I/O module 102 and/or a control module 104) to verify that the power supply 120 is mated with an appropriate and/or desired device. If not, the alert module 146 can be used to alert an operator (e.g., via a network). In some embodiments, an alert is provided to an operator in the form of an email. In other embodiments, an alert is provided to an operator in the form of a text message. However, these alerts are provided by way of example and are not meant to limit the present disclosure. In other embodiments, different alerts are provided to an operator. Further, multiple alerts can be provided to an operator when a condition is met for an authentication procedure (e.g., an email and a text message, and so forth). It should also be noted that alerts can be provided by an authentication module 134 and/or an alert module 146 for other conditions, including, but not necessarily limited to: power supply failure, battery module failure, connected device failure, various error conditions for a power supply and/or a powered device, and so forth.

The authentication module 134 can also be configured to encrypt communication between the power supply 120 and one or more devices connected to the power supply 120. As shown in FIG. 1, a power supply 120 can include an encryption module 148. For example, one or more cryptographic protocols are used to transmit information between the power supply 120 and a powered device. Examples of such cryptographic protocols include, but are not necessarily limited to: a transport layer security (TLS) protocol, a secure sockets layer (SSL) protocol, and so forth. For instance, communications between a power supply 120 and a powered device can use HTTP secure (HTTPS) protocol, where HTTP protocol is layered on SSL and/or TLS protocol.

In some embodiments, an authentication sequence can be performed between a power supply 120 and a device connected to the power supply 120. For example, the power supply 120 authenticates a coupled I/O device 102, a control module 104, and so forth, by performing an authentication sequence using the authentication module 134 of the controller 128. In other embodiments, a device connected to the power supply 120 can authenticate the power supply 120. For instance, a control module 104 authenticates a coupled power supply 120 by performing an authentication sequence with the authentication module 134 of the controller 128. In further embodiments, one power supply 120 can authenticate another power supply 120. For example, a first power supply 120 authenticates a second (e.g., redundant) power supply 120 by performing an authentication sequence between a first authentication module 134 of the controller 128 of the first power supply 120 and a second authentication module 134 of the controller 128 of the second power supply 120. In some embodiments, the second power supply 120 can also authenticate the first power supply 120.

It should be noted that while the processor 140 and memory 142 are described with some specificity as part of the controller 128 (e.g., with reference to FIG. 1), this configuration is provided by way of example and is not meant to limit the present disclosure. Thus, one or more of the battery modules 122 can also include a processor, a memory, and so forth (e.g., in addition to or in place of the processor 140 and memory 142 included with the controller 128). In such embodiments, one or more of the battery modules 122 can include one or more authentication modules 134, e.g., where an authentication module 134 employs a processor and a memory (possibly storing one or more keys, certificates, unique identifiers, security credentials, and so on) to authenticate the battery modules 134 to one or more other devices (e.g., other battery modules 122, the controller 128, control elements or subsystems, and so forth) and/or to authenticate other devices (e.g., other battery modules 122, the controller 128, control elements or subsystems, and so on) coupled with the power supply 120.

In some embodiments, a battery module 134 can authenticate the controller 128 of the power supply 120 and/or a connected device, such as a powered device coupled with the power supply 120. For example, the battery module 134 authenticates the controller 128 of a power supply 120 and/or a coupled I/O device 102, a control module 104, and so forth, by performing an authentication sequence using an authentication module 134 of the battery module 134. In other embodiments, a powered device connected to a power supply 120 can authenticate one or more of the battery modules 122. For instance, a control module 104 authenticates one or more (e.g., each) battery module 122 of a connected power supply 120 by performing an authentication sequence with the authentication module 134 of the respective battery modules 134.

In some embodiments, the controller 128 can authenticate one or more of the battery modules 134. For example, the controller 128 authenticates one or more battery modules 134 by performing an authentication sequence between the authentication module 134 of the controller 128 and authentication modules 134 of respective battery modules 122. In further embodiments, one battery module 122 can authenticate another battery module 122. For example, a first battery module 122 authenticates a second battery module 122 by performing an authentication sequence between a first authentication module 134 of the first battery module 122 and a second authentication module 134 of the second battery module 122. In some embodiments, the second battery module 122 can also authenticate the first battery module 122.

The power supply 120 can be used with an industrial control system. For example, with reference to FIG. 2, an example industrial control system 100 is described in accordance with the present disclosure. In embodiments, the industrial control system 100 may comprise an industrial control system (ICS), a programmable automation controller (PAC), a supervisory control and data acquisition (SCADA) system, a distributed control system (DCS), programmable logic controller (PLC), and industrial safety system certified to safety standards such as IEC1508, or the like. The industrial control system 100 uses a communications control architecture to implement a distributed control system that includes control elements or subsystems, where the subsystems are controlled by one or more controllers distributed throughout the system. For example, one or more I/O modules 102 are connected to one or more control modules 104. The industrial control system 100 is configured to transmit data to and from the I/O modules 102. The I/O modules 102 can comprise input modules, output modules, and/or input and output modules. For instance, input modules can be used to receive information from input sensors in the process, while output modules can be used to transmit instructions to output actuators. For example, an I/O module 104 can be connected to a process sensor 106 (e.g., illumination, radiation, gas, temperature, electrical, magnetic, and/or acoustic sensor) for measuring pressure in piping for a gas plant, a refinery, and so forth and/or connected to a process actuator 108 (e.g., control valve, hydraulic actuator, magnetic actuator, motor, solenoid, electrical switch, transmitter, or the like).

In implementations, the I/O modules 102 can be used to control systems and collect data in applications including, but not necessarily limited to: industrial processes, such as manufacturing, production, power generation, fabrication, and refining; infrastructure processes, such as water treatment and distribution, wastewater collection and treatment, oil and gas pipelines, electrical power transmission and distribution, wind farms, and large communication systems; facility processes for buildings, airports, ships, and space stations (e.g., to monitor and control Heating, Ventilation, and Air Conditioning (HVAC) equipment and energy consumption); large campus industrial process plants, such as oil and gas, refining, chemical, pharmaceutical, food and beverage, water and wastewater, pulp and paper, utility power, mining, metals; and/or critical infrastructures.

In implementations, an I/O module 102 can be configured to convert analog data received from the sensor 106 to digital data (e.g., using Analog-to-Digital Converter (ADC) circuitry, and so forth). An I/O module 102 can also be connected to an actuator 108 and configured to control one or more operating characteristics of the actuator 108, such as speed, torque, and so forth. Further, the I/O module 102 can be configured to convert digital data to analog data for transmission to the actuator 108 (e.g., using Digital-to-Analog (DAC) circuitry, and so forth). In implementations, one or more of the I/O modules 102 can comprise a communications module configured for communicating via a communications sub-bus, such as an Ethernet bus, an H1 field bus, a Process Field Bus (PROFIBUS), a Highway Addressable Remote Transducer (HART) bus, a Modbus, and so forth. Further, two or more I/O modules 102 can be used to provide fault tolerant and redundant connections for a communications sub-bus.

Each I/O module 102 can be provided with a unique identifier (ID) for distinguishing one I/O module 102 from another I/O module 102. In implementations, an I/O module 102 is identified by its ID when it is connected to the industrial control system 100. Multiple I/O modules 102 can be used with the industrial control system 100 to provide redundancy. For example, two or more I/O modules 102 can be connected to the sensor 106 and/or the actuator 108. Each I/O module 102 can include one or more ports that furnish a physical connection to hardware and circuitry included with the I/O module 102, such as a printed circuit board (PCB), and so forth.

One or more of the I/O modules 102 can include an interface for connecting to other networks including, but not necessarily limited to: a wide-area cellular telephone network, such as a 3G cellular network, a 4G cellular network, or a Global System for Mobile communications (GSM) network; a wireless computer communications network, such as a Wi-Fi network (e.g., a Wireless LAN (WLAN) operated using IEEE 802.11 network standards); a Personal Area Network (PAN) (e.g., a Wireless PAN (WPAN) operated using IEEE 802.15 network standards); a Wide Area Network (WAN); an intranet; an extranet; an internet; the Internet; and so on. Further, one or more of the I/O modules 102 can include a connection for connecting an I/O module 102 to a computer bus, and so forth.

The control modules 104 can be used to monitor and control the I/O modules 102, and to connect two or more I/O modules 102 together. In embodiments of the disclosure, a control module 104 can update a routing table when an I/O module 102 is connected to the industrial control system 100 based upon a unique ID for the I/O module 102. Further, when multiple redundant I/O modules 102 are used, each control module 104 can implement mirroring of informational databases regarding the I/O modules 102 and update them as data is received from and/or transmitted to the I/O modules 102. In some implementations, two or more control modules 104 are used to provide redundancy. For added security, the control modules 104 can be configured to perform an authentication sequence or handshake to authenticate one another at predefined events or times including, but not necessarily limited to: startup, reset, installation of a new control module 104, replacement of a control module 104, periodically, scheduled times, and so forth. Further, the control modules 104 can be configured to perform an authentication at random (e.g., pseudorandom) time intervals.

Data transmitted by the industrial control system 100 can be packetized, i.e., discrete portions of the data can be converted into data packets comprising the data portions along with network control information, and so forth. The industrial control system 100 can use one or more protocols for data transmission, including a bit-oriented synchronous data link layer protocol such as High-Level Data Link Control (HDLC). In some embodiments, the industrial control system 100 implements HDLC according to an International Organization for Standardization (ISO) 13239 standard, or the like. Further, two or more control modules 104 can be used to implement redundant HDLC. However, it should be noted that HDLC is provided by way of example only and is not meant to be restrictive of the present disclosure. Thus, the industrial control system 100 can use other various communications protocols in accordance with the present disclosure.

One or more of the control modules 104 can be configured for exchanging information with components used for monitoring and/or controlling the instrumentation connected to the industrial control system 100 via the I/O modules 102, such as one or more control loop feedback mechanisms/controllers. In implementations, a controller can be configured as a microcontroller/Programmable Logic Controller (PLC), a Proportional-Integral-Derivative (PID) controller, and so forth. In embodiments of the disclosure, the I/O modules 102 and the control modules 104 include network interfaces, e.g., for connecting one or more I/O modules 102 to one or more controllers via a network 110. In implementations, a network interface can be configured as a Gigabit Ethernet interface for connecting the I/O modules 102 to a Local Area Network (LAN). Further, two or more control modules 104 can be used to implement redundant Gigabit Ethernet.

However, it should be noted that Gigabit Ethernet is provided by way of example only and is not meant to be restrictive of the present disclosure. Thus, a network interface can be configured for connecting the control modules 104 to other various networks including, but not necessarily limited to: a wide-area cellular telephone network, such as a 3G cellular network, a 4G cellular network, or a GSM network; a wireless computer communications network, such as a Wi-Fi network (e.g., a WLAN operated using IEEE 802.11 network standards); a PAN (e.g., a WPAN operated using IEEE 802.15 network standards); a WAN; an intranet; an extranet; an internet; the Internet; and so on. Additionally, a network interface can be implemented using a computer bus. For example, a network interface can include a Peripheral Component Interconnect (PCI) card interface, such as a Mini PCI interface, and so forth. Further, the network 110 can be configured to include a single network or multiple networks across different access points.

Referring now to FIG. 3, the industrial control system 100 can receive electrical power from multiple sources. For example, AC power is supplied from a power grid 112 (e.g., using high voltage power from AC mains). AC power can also be supplied using local power generation (e.g., an on-site turbine or diesel local power generator 114). A power supply 116 is used to distribute electrical power from the power grid 112 to automation equipment of the industrial control system 100, such as controllers, I/O modules, and so forth. Another power supply 118 is used to distribute electrical power from the local power generator 114 to the automation equipment. The industrial control system 100 also includes an additional (backup) power supply 120 configured to store and return DC power using multiple battery modules 122. For example, the power supply 120 functions as a UPS. In embodiments of the disclosure, multiple power supplies 116, 118, and/or 120 are distributed (e.g., physically decentralized) within the industrial control system 100.

In some embodiments, one or more power supplies 116, 118, and/or 120 are provided at the level of a cabinet. For example, one power supply 120 is used to provide backup power to a control module 104 and its associated I/O modules 102. In other embodiments, one power supply 120 is used to provide backup power to a control module 104, and another power supply 120 is used to provide backup power to an associated I/O module 102 (e.g., where the I/O module 102 and the control module 104 are physically separated by some distance within a facility, where electrical isolation is maintained between the I/O module 102 and the control module 104, and so forth).

The power supplies 116, 118, and/or 120 can also be configured to power field devices, such as the sensor 106 and/or the actuator 108 described with reference to FIG. 2. For example, one or more of the power supplies 116 and 118 includes an AC-to-DC (AC/DC) converter for converting AC (e.g., as supplied by AC mains) to DC for transmission to the actuator 108 (e.g., in an implementation where the actuator 108 is a DC motor or other DC actuator). Further, two or more power supplies 116, 118, and/or 120 used to provide redundancy can be connected to automation equipment of the industrial control system 100 using a separate (redundant) power backplane for each power supply 120.

Referring to FIG. 4, the power supply 120 includes multiple battery modules 122. In embodiments of the disclosure, each battery module 122 comprises a lithium-ion battery cell 124. For example, a battery module 122 is implemented using a one and one-half volt (1.5V) lithium-ion battery cell, a three volt (3V) lithium-ion battery cell, and so forth. In some embodiments, the power supply 120 includes between eight (8) and ten (10) battery modules 122 stacked together. However, a stack of between eight (8) and ten (10) battery modules 122 is provided by way of example only and is not meant to limit the present disclosure. In other embodiments, fewer than eight (8) or more than ten (10) battery modules 122 are stacked together.

Another embodiment of the power supply 120 is shown in FIG. 10. The power supply 120 may include a battery pack including a stack of battery modules 122 (each including one or more battery cells). In some embodiments, each battery module 122 is encased in a battery module protection layer 404 (e.g., a galvanic isolation layer), and the battery modules 122 are stacked together to form a battery pack. The stacked battery modules 122 (i.e., the battery pack) can also be encased by a battery pack protection layer 402 (e.g., another galvanic isolation layer or shielding barrier). The power supply 120 can include one or more battery packs and can further have a power supply protection layer 400 (e.g., an industrial grade (e.g., aluminum) casing around the battery module(s) making up the power supply 120). In some embodiments, the power supply protection layer/encasement 400 is assembled in a multi-ton press with water tight connectors. The power supply protection layer/encasement 400 may be mountable in one or more orientations (e.g., a plurality of possible orientations for field deployment).

It should be noted that although the battery modules 122 are described as including lithium-ion battery cells 124, systems and techniques of the present disclosure can use other rechargeable battery, storage, and/or accumulator technologies including, but not necessarily limited to: lead-acid batteries, alkaline batteries, nickel-cadmium batteries, nickel-metal hydride batteries, lithium-ion polymer batteries, lithium sulfur batteries, thin film lithium batteries, potassium-ion batteries, sodium-ion batteries, nickel-iron batteries, nickel-hydrogen batteries, nickel-zinc batteries, lithium-air batteries, lithium iron phosphate batteries, lithium-titanate batteries, zinc bromide batteries, vanadium redox batteries, sodium-sulfur batteries, molten salt batteries, silver-oxide batteries, and so forth.

Each of the battery modules 122 includes a real-time battery monitor 126, which can be implemented using, for example, a printed circuit board (PCB). In embodiments of the disclosure, the battery monitors 126 are used by the controller 128 (e.g., a microcontroller) that operates the battery cells 124. For example, each battery monitor 126 provides diagnostic information for each respective battery cell 124 to the controller 128. Diagnostic information includes, but is not necessarily limited to: the operating voltage of a battery cell 124, the operating current of a battery cell 124 (e.g., in amperes), units of electrical charge into a battery cell 124 (e.g., in coulombs), units of electrical charge out of a battery cell 124 (e.g., in coulombs), the age of a battery cell 124 (e.g., in units of time, in number of charge/discharge cycles, etc.), and so forth.

In embodiments, controller 128 is configured as a self-hosted server and/or communicatively coupled with a self-hosted server for the power supply 120. The self-hosted server can, for example, comprise a server that maintains data in a local memory (e.g., internal hard drive, solid state disk drive, flash memory, etc.). The self-hosted server can receive and store the diagnostic information from each battery monitor 126 of the power supply. The self-hosted server is configured to provide network access to the diagnostic information. For example, the self-hosted server can broadcast the diagnostic information or can provide access to a database, file directory, or log via an internet or intranet connection to the server. In embodiments, the self-hosted server is compliant with IEEE 62541 OPC Unified Architecture communication stack. The self-hosted server can provide access to a variety of power variables and/or diagnostic that can be controlled, monitored, trended, alarmed, and/or historicized by industrial control system applications, enterprise, and/or secured network (e.g., cloud) computing applications having permissions to monitor the power supply network.

In some embodiments, each battery monitor 126 is separately connected to the controller 128. In other embodiments, multiple battery monitors 126 are connected to a shared communications channel, such as a serial bus, connected to the controller 128. The battery monitors 126 are also connected to a power regulator 130 (e.g., including a transformer), which receives electrical power from an external power supply, such as the power supply 116 and/or the power supply 118. The battery cells 124 are charged using electrical energy supplied from the power regulator 130. Electrical energy is discharged from the battery cells 124 using another power regulator 132, which can be used to adjust one or more output characteristics of the electrical energy supplied by the battery cells 124, such as voltage. In embodiments, the power regulator 130 can implement an interleaved Power Factor Correction (PFC) to achieve a near-unity power factor and zero switching topology to drive MOSFET transition losses to zero.

In embodiments of the disclosure, each battery module 122 comprises a support frame with a foil-wrapped battery cell 124, where multiple support frames can be stacked so that the battery cells 124 remain sealed, while allowing for expansion and contraction of the battery cells 124 within the foil. In embodiments of the disclosure, the PCB comprising the battery monitor 126 is also encased with the battery cell 124 in the support frame. Further, the PCB is powered by the battery cell 124 and configured to limit the current into and out of each battery cell 124. For example, the battery monitor 126 includes an electronic signal switching device (e.g., two (2) field-effect transistors (FETs) connected in series in the manner of an analog switch) that prevents energy from being stored in the battery and/or returned from the battery without authorization from the battery monitor 126. In this manner, electrical connection to a battery cell 124 is prevented when the terminals of the battery cell 124 are connected to an unintended electrical path (e.g., short circuited). Further, electrical connection to a battery cell 124 is prevented when the battery monitor 126 is inactive (e.g., when there is no charge in the battery cell 124). In this example, the battery modules 122 are at least partially charged when they are inserted into the power supply 120.

In embodiments of the disclosure, the battery modules 122 are stacked and connected using electrical contacts (e.g., electrical connectors) disposed on each support frame. The electrical connectors are electrically connected to the battery cells 124 (e.g., via the battery monitor PCB) and can be disposed on the support frame without wires extending from the support frame (which would otherwise require soldered connections to a battery cell 124). For example, a snap-fit electrical connector is provided on one support frame (e.g., disposed on a top surface of a support frame) that mates with a corresponding snap-fit electrical connector on another support frame (e.g., disposed on a bottom surface of another support frame). The electrical connectors can be configured to increase the surface area of contact between electrical connectors and/or to provide self-alignment of the electrical connectors (e.g., by configuring a portion of one electrical connector for insertion into another electrical connector).

In embodiments of the disclosure, the electrical connectors are geometrically arranged (e.g., positioned, sized, etc.) to prevent multiple battery modules 122 from being connected together in an unintended manner. For instance, one electrical contact can be oriented generally upwardly with respect to a support frame, while another electrical contact can be oriented generally downwardly with respect to the support frame. In other embodiments, visual cues are provided for aligning two battery modules 122 (e.g., color-coding, indicia, etc.).

Further, the power supply 120 can include slots, channels, tracks, and so forth to provide mechanical registration for the battery modules 122, such as for aligning the electrical connectors of one battery module 122 with mating electrical connectors of another battery module 122 and/or with electrical connectors to the power supply 120. For example, a battery module 122 includes tabs or posts configured for insertion into respective tracks of a housing of the power supply 120, and providing alignment of the battery modules 122 with respect to the housing. Further, the controller 128 can associate a unique physical identification (ID) with each battery module 122 to uniquely identify each battery module 120 coupled in a particular sequence and/or at a particular position with respect to the housing of the power supply 120.

In embodiments of the disclosure, the power supply 120 is constructed for cabinet mounting, rack mounting, wall mounting, and so forth. The housing of the power supply 120 can be constructed of a rigid, insulating material, such as acrylonitrile butadiene styrene (ABS) or another plastic material, which can be used to contain the energy that would otherwise be released in the event of a battery cell failure. Further, the housing can be configured to contain, or at least substantially contain, chemical battery cell components, such as lithium, that may be released due to a battery failure. Additionally, the components contained in the power supply 120 can be electrically isolated from one another. For example, signals to the controller 128 are galvanically isolated from the battery monitors 126 and battery cells 124. Further, the controller 128 and the power regulator 130 are electrically and/or fault isolated from the battery modules 122 and the power regulator 132 (e.g., using separate transformers, optical isolators, and so forth).

Referring now to FIG. 5, the controller 128 is connected to the industrial control system 100 (e.g., via the network 110). In embodiments of the disclosure, the controller 128 implements security and/or diagnostics at the controller level and/or at the level of each battery module 122. A controller 128, including some or all of its components, can operate under computer control. For example, a processor 140 can be included with or in a controller 128 to control the components and functions of controllers 128 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the controllers 128. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

The processor 140 provides processing functionality for the controller 128 and can include any number of processors, micro-controllers, or other processing systems, and resident or external memory for storing data and other information accessed or generated by the controller 128. The processor 140 can execute one or more software programs that implement techniques described herein. The processor 140 is not limited by the materials from which it is formed or the processing mechanisms employed therein and, as such, can be implemented via semiconductor(s) and/or transistors (e.g., using electronic integrated circuit (IC) components), and so forth.

The controller 128 also includes the memory 142. The memory 142 is an example of tangible, computer-readable storage medium that provides storage functionality to store various data associated with operation of the controller 128, such as software programs and/or code segments, or other data to instruct the processor 140, and possibly other components of the controller 128, to perform the functionality described herein. Thus, the memory 142 can store data, such as a program of instructions for operating the power supply 120 (including its components), and so forth. In embodiments of the disclosure, the memory 142 can store a unique identifier 136 and/or a security credential 138 for the power supply 120. It should be noted that while a single memory 142 is described, a wide variety of types and combinations of memory (e.g., tangible, non-transitory memory) can be employed. The memory 142 can be integral with the processor 140, can comprise stand-alone memory, or can be a combination of both. The memory 142 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the power supply 120 and/or the memory 142 can include removable integrated circuit card (ICC) memory, such as memory provided by a subscriber identity module (SIM) card, a universal subscriber identity module (USIM) card, a universal integrated circuit card (UICC), and so on.

The controller 128 includes a communications interface 150. The communications interface 150 is operatively configured to communicate with components of the power supply 120. For example, the communications interface 150 can be configured to transmit data for storage in the controller 128, retrieve data from storage in the controller 128, and so forth. The communications interface 150 is also communicatively coupled with the processor 140 to facilitate data transfer between components of the power supply 120 and the processor 140, e.g., for communicating inputs to the processor 140 received from a device communicatively coupled with the controller 128 and/or communicating outputs to a device communicatively coupled with the controller 128, such as the battery monitors 126. For example, the communications interface 150 is implemented using a shared communications channel, such as a serial bus, to connect the processor to multiple battery monitors 126.

In embodiments of the disclosure, the controller 128 is configured for two-way communication with the battery monitors 126. For example, the controller 128 collects diagnostic information (e.g., status information and/or reliability information regarding the battery cells 124) from the battery monitors 126. The controller 128 also operates the battery modules 122, e.g., instructing the battery modules 122 to store and return electrical energy supplied from the power supply 116, the power supply 118, and so forth. It should be noted that while the communications interface 150 is described as a component of a controller 128, one or more components of the communications interface 150 can be implemented as external components communicatively coupled to the controller 128 via a wired and/or wireless connection. The controller 128 can also comprise and/or connect to one or more input/output (I/O) devices (e.g., via the communications interface 150) including, but not necessarily limited to: a display, a mouse, and so on. For example, the controller 128 can be connected to a display device, such as a multi-color (e.g., tri-color) light emitting diode (LED) (e.g., the indicator light 144), which can indicate the status of the power supply 120.

The communications interface 150 and/or the processor 140 can be configured to communicate with a variety of different networks 110, including, but not necessarily limited to: a wide-area cellular telephone network, such as a 3G cellular network, a 4G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Additionally, the communications interface 150 can be implemented using a computer bus. For example, a communications interface 150 can include a PCI card interface, such as a Mini PCI interface, and so forth. Further, the communications interface 150 can be configured to communicate with a single network 110 or multiple networks across different access points. In this manner, the controller 128 is used to communicatively couple the power supply 120 to the industrial control system 100.

Referring now to FIG. 6, the control elements or subsystems (e.g., the I/O modules 102, the control modules 104, the power supplies 120, and so forth) are connected together by one or more backplanes. For example, control modules 104 can be connected to I/O modules 102 by a communications backplane 152. Further, power supplies 116, 118, and/or 120 can be connected to I/O modules 104 and/or to control modules 106 by a power backplane 154. In some implementations, each control module 104 and/or I/O module 102 may have at least one independent trace on the backplane 154 defining a power channel that has galvanic isolation and independent control from other channels (i.e., traces) coupling other control modules 104 and/or I/O modules 102. In embodiments of the disclosure, physical interconnect devices (e.g., switches, connectors, or cables such as, but not limited to, those described in U.S. Non-Provisional patent application Ser. No. 14/446,412) are used to connect to the I/O modules 102, the control modules 104, the power supplies 120, and possibly other industrial control system equipment. For example, a cable is used to connect a control module 104 to a network 110, another cable is used to connect a power supply 120 to a power grid 112, another cable is used to connect a power supply 120 to a local power generator 114, and so forth.

Another embodiment of the power distribution architecture is illustrated in FIG. 11. A power distribution network 500 can include a power supply 502 (e.g., a field-mounted UPS) coupled to one or more power modules 504 that are mounted to a backplane 154 for furnishing power to control modules 506, input/output modules 506, 508, 510, 512, and so forth. As shown in FIG. 12, the power distribution network may include additional (e.g., supplemental) secure power supplies 514 that can be electrically connected to power supply 502 (e.g., a secure UPS) for providing supplemental power or for providing power to other devices than those powered by power supply 502. In embodiments, power supply 502 and secure power supplies 514 can be configured to transmit power bi-directionally with one another based on network requirements and/or to maintain threshold charge levels among the power supplies.

Referring again to FIG. 6, the industrial control system 100 can implement a secure control system. For example, the industrial control system 100 includes a security credential source (e.g., a factory 156) and a security credential implementer (e.g., a key management entity 158). The factory 156 is configured to generate a unique security credential (e.g., a key, a certificate, etc., such as the unique identifier 136 and/or the security credential 138). The key management entity 158 is configured to provision the I/O modules 102, the control modules 104, the power supply 116, the power supply 118, and/or the power supply 120 (e.g., including one or more of the multiple battery modules 122 and/or the controller 128) with a unique security credential generated by the factory 156. For instance, an I/O module 102 and an associated power supply 120 can each be provisioned with unique security credentials.

Then, an authentication process for authenticating the control elements or subsystems implemented in the industrial control system 100 is performed based upon the unique security credentials. For example, in embodiments, the control module 104 and the power supply 120 are operable to bi-directionally communicate with one another based on the unique security credentials (e.g., based upon the authentication process). Further, in the secure industrial control system 100 disclosed herein, multiple (e.g., every) control elements and subsystems (e.g., I/O modules, power supplies, physical interconnect devices, etc.) of the industrial control system 100 are provisioned with security credentials for providing security at multiple (e.g., all) levels of the industrial control system 100. Still further, the elements can be provisioned with the unique security credentials (e.g., keys, certificates, etc.) during manufacture (e.g., at birth), and can be managed from birth by a key management entity of the industrial control system 100 for promoting security of the industrial control system 100.

In some embodiments, the control elements or subsystems are connected using controllers connected to or included in physical interconnect devices (e.g., one-wire encryption chips) which allow for implementation of authentication between a component (e.g., a power supply 120) and the physical interconnect device (e.g., cable assembly) connected to that component. For example, microprocessor secure encrypted technology can be built into the cable assembly and keyed to a specific component of the industrial control system 100. This configuration provides security for the industrial control system 100 when a user installs (e.g., plugs) the cable assembly into a component which is not configured to be connected with that cable assembly. In embodiments, a one-wire serial key (e.g., a one-wire embedded key) is implemented in one or more (e.g., each of) the physical interconnect devices.

In embodiments of the disclosure, communications between elements and/or physical interconnect devices (e.g., cable assemblies) of the industrial control system 100 include an authentication process. The authentication process can be performed for authenticating an element and/or physical interconnect device implemented in the industrial control system 100. In implementations, the authentication process can utilize security credentials associated with the element and/or physical interconnect device for authenticating that element and/or physical interconnect device. For example, the security credentials can include encryption keys, certificates (e.g., public key certificates, digital certificates, identity certificates, security certificates, asymmetric certificates, standard certificates, non-standard certificates) and/or identification numbers. In embodiments, controllers (e.g., secure microcontrollers) that are included in and/or connected to the components and/or physical interconnect devices of the industrial control system 100 can be configured for performing the authentication process.

In implementations, multiple control elements or subsystems (e.g., elements and/or physical interconnect devices) of the industrial control system 100 are provisioned with their own unique security credentials. For example, each element of the industrial control system 100 is provisioned with its own unique set(s) of certificates, encryption keys and/or identification numbers when the element is manufactured (e.g., the individual sets of keys and certificates are defined at the birth of the element). The sets of certificates, encryption keys and/or identification numbers are configured for providing/supporting strong encryption. The encryption keys can be implemented with standard (e.g., commercial off-the-shelf (COTS)) encryption algorithms, such as National Security Agency (NSA) algorithms, National Institute of Standards and Technology (NIST) algorithms, or the like.

In some embodiments, cryptographic keys and certificates can be stored in on-chip memory (OCM), for example, in SRAM of an authentication module. Additionally, sensitive tasks (e.g., tasks with secret information and sometimes even with public information) may have a stack that executes in OCM. For example, cryptographic tasks may be performed in kernel space or application space from stacks locally stored in OCM.

Based upon the results of the authentication process, element being authenticated can be activated, partial functionality of the element can be enabled or disabled within the industrial control system 100, complete functionality of the element can be enabled within the industrial control system 100, and/or functionality of the element within the industrial control system 100 can be completely disabled (e.g., no communication facilitated between that element and other elements of the industrial control system 100).

In embodiments, the keys, certificates and/or identification numbers associated with an element of the industrial control system 100 can specify the original equipment manufacturer (OEM) of that element. As used herein, the term "original equipment manufacturer" or "OEM" can be defined as an entity that physically manufactures the device (e.g., element) and/or a supplier of the device such as an entity that purchases the device from a physical manufacturer and sells the device. Thus, in embodiments, a device can be manufactured and distributed (sold) by an OEM that is both the physical manufacturer and the supplier of the device. However, in other embodiments, a device can be distributed by an OEM that is a supplier, but is not the physical manufacturer. In such embodiments, the OEM can cause the device to be manufactured by a physical manufacturer (e.g., the OEM can purchase, contract, order, etc. the device from the physical manufacturer).

Additionally, where the OEM comprises a supplier that is not the physical manufacturer of the device, the device can bear the brand of the supplier instead of brand of the physical manufacturer. For example, in embodiments where an element (e.g., a power supply 120) is associated with a particular OEM that is a supplier but not the physical manufacturer, the element's keys, certificates and/or identification numbers can specify that origin. During authentication of an element of the industrial control system 100, when a determination is made that an element being authenticated was manufactured or supplied by an entity that is different than the OEM of one or more other elements of the industrial control system 100, then the functionality of that element can be at least partially disabled within the industrial control system 100. For example, limitations can be placed upon communication (e.g., data transfer) between that element and other elements of the industrial control system 100, such that the element cannot work/function within the industrial control system 100. When one of the elements of the industrial control system 100 requires replacement, this feature can prevent a user of the industrial control system 100 from unknowingly replacing the element with a non-homogenous element (e.g., an element having a different origin (a different OEM) than the remaining elements of the industrial control system 100) and implementing the element in the industrial control system 100. In this manner, the techniques described herein can prevent the substitution of elements of other OEM's into a secure industrial control system 100. In one example, the substitution of elements that furnish similar functionality in place of elements provided by an originating OEM can be prevented, since the substituted elements cannot authenticate and operate within the originating OEM's system. In another example, a first reseller can be provided with elements having a first set of physical and cryptographic labels by an originating OEM, and the first reseller's elements can be installed in an industrial control system 100. In this example, a second reseller can be provided with elements having a second (e.g., different) set of physical and cryptographic labels by the same originating OEM. In this example, the second reseller's elements may be prevented from operating within the industrial control system 100, since they may not authenticate and operate with the first reseller's elements.

However, it should also be noted that the first reseller and the second reseller may enter into a mutual agreement, where the first and second elements can be configured to authenticate and operate within the same industrial control system 100. Further, in some embodiments, an agreement between resellers to allow interoperation can also be implemented so the agreement only applies to a specific customer, group of customers, facility, etc.

In another instance, a user can attempt to implement an incorrectly designated (e.g., mismarked) element within the industrial control system 100. For example, the mismarked element can have a physical indicia marked upon it which falsely indicates that the element is associated with the same OEM as the OEM of the other elements of the industrial control system 100. In such instances, the authentication process implemented by the industrial control system 100 can cause the user to be alerted that the element is counterfeit. This process can also promote improved security for the industrial control system 100, since counterfeit elements are often a vehicle by which malicious software can be introduced into the industrial control system 100. In embodiments, the authentication process provides a secure air gap for the industrial control system 100, ensuring that the secure industrial control system is physically isolated from insecure networks.

The key management entity 158 can be configured for managing cryptographic keys (e.g., encryption keys) in a cryptosystem. This managing of cryptographic keys (e.g., key management) can include the generation, exchange, storage, use, and/or replacement of the keys. For example, the key management entity 158 is configured to serve as a security credentials source, generating unique security credentials (e.g., public security credentials, secret security credentials) for the elements of the industrial control system 100. Key management pertains to keys at the user and/or system level (e.g., either between users or systems).

In embodiments, the key management entity 158 comprises a secure entity such as an entity located in a secure facility. The key management entity 158 can be remotely located from the I/O modules 102, the control modules 104, and the network 110. For example, a firewall 160 can separate the key management entity 158 from the control elements or subsystems and the network 110 (e.g., a corporate network). In implementations, the firewall 160 can be a software or hardware-based network security system that controls ingoing and outgoing network traffic by analyzing data packets and determining whether the data packets should be allowed through or not, based on a rule set. The firewall 160 thus establishes a barrier between a trusted, secure internal network (e.g., the network 110) and another network 162 that is not assumed to be secure and trusted (e.g., a cloud and/or the Internet). In embodiments, the firewall 160 allows for selective (e.g., secure) communication between the key management entity 158 and one or more of the control elements or subsystems and/or the network 110. In examples, one or more firewalls can be implemented at various locations within the industrial control system 100. For example, firewalls can be integrated into switches and/or workstations of the network 110.

As described, the secure industrial control system 100 can further include one or more manufacturing entities (e.g., factories 156). The factories 156 can be associated with original equipment manufacturers (OEMs) for the elements of the industrial control system 100. The key management entity 158 can be communicatively coupled with the manufacturing entity via a network (e.g., a cloud). In implementations, when the elements of the industrial control system 100 are being manufactured at the one or more factories 156, the key management entity 158 can be communicatively coupled with (e.g., can have an encrypted communications pipeline to) the elements. The key management entity 158 can utilize the communications pipeline for provisioning the elements with security credentials (e.g., inserting keys, certificates and/or identification numbers into the elements) at the point of manufacture.

Further, when the elements are placed into use (e.g., activated), the key management entity 158 can be communicatively coupled (e.g., via an encrypted communications pipeline) to each individual element worldwide and can confirm and sign the use of specific code, revoke (e.g., remove) the use of any particular code, and/or enable the use of any particular code. Thus, the key management entity 158 can communicate with each element at the factory where the element is originally manufactured (e.g., born), such that the element is born with managed keys. A master database and/or table including all encryption keys, certificates and/or identification numbers for each element of the industrial control system 100 can be maintained by the key management entity 158. The key management entity 158, through its communication with the elements, is configured for revoking keys, thereby promoting the ability of the authentication mechanism to counter theft and re-use of components.

In implementations, the key management entity 158 can be communicatively coupled with one or more of the control elements and sub-systems and/or the network 110 via another network (e.g., a cloud and/or the Internet) and firewall. For example, in embodiments, the key management entity 158 can be a centralized system or a distributed system. Moreover, in embodiments, the key management entity 158 can be managed locally or remotely. In some implementations, the key management entity 158 can be located within (e.g., integrated into) the network 110 and/or the control elements or subsystems. The key management entity 158 can provide management and/or can be managed in a variety of ways. For example, the key management entity 158 can be implemented/managed: by a customer at a central location, by the customer at individual factory locations, by an external third party management company and/or by the customer at different layers of the industrial control system 100, and at different locations, depending on the layer.

Varying levels of security (e.g., scalable, user-configured amounts of security) can be provided by the authentication process. For example, a base level of security can be provided which authenticates the elements and protects code within the elements. Other layers of security can be added as well. For example, security can be implemented to such a degree that a component, such as the power supply 120, cannot power up without proper authentication occurring. In implementations, encryption in the code is implemented in the elements, security credentials (e.g., keys and certificates) are implemented on the elements. Security can be distributed (e.g., flows) through the industrial control system 100. For example, security can flow through the industrial control system 100 all the way to an end user, who knows what a module is designed to control in that instance. In embodiments, the authentication process provides encryption, identification of devices for secure communication and authentication of system hardware or software components (e.g., via digital signature).

In implementations, the authentication process can be implemented to provide for and/or enable interoperability within the secure industrial control system 100 of elements manufactured and/or supplied by different manufacturers/ vendors/suppliers (e.g., OEMs). For example, selective (e.g., some) interoperability between elements manufactured and/or supplied by different manufacturers/vendors/suppliers can be enabled. In embodiments, unique security credentials (e.g., keys) implemented during authentication can form a hierarchy, thereby allowing for different functions to be performed by different elements of the industrial control system 100.

The communication links connecting the components of the industrial control system 100 can further employ data packets, such as runt packets (e.g., packets smaller than sixty-four (64) bytes), placed (e.g., injected and/or stuffed) therein, providing an added level of security. The use of runt packets increases the level of difficulty with which outside information (e.g., malicious content such as false messages, malware (viruses), data mining applications, etc.) can be injected onto the communications links. For example, runt packets can be injected onto a communication link within gaps between data packets transmitted between a control module 104 and a power supply 120 to hinder an external entity's ability to inject malicious content onto the communication link.

In embodiments of the disclosure, to initiate an authentication sequence, a first authentication module (e.g., included in a power supply 120, a controller 128 of a power supply 120, a battery module 122 of a power supply 120, a control element or subsystem, such as an I/O device 102, a control module 104, and so forth) is configured to transmit a request datagram to a second authentication module (e.g., included in a power supply 120, a controller 128 of a power supply 120, a battery module 122 of a power supply 120, a control element or subsystem, such as an I/O device 102, a control module 104, and so forth). In implementations, the request datagram includes a first plain text nonce (NonceA), a first device authentication key certificate (CertDAKA) containing a first device authentication key (DAKA), and a first identity attribute certificate (IACA). In some embodiments, the first authentication module is configured to generate the first nonce (NonceA) with a true random number generator (hereinafter "TRNG") and concatenate or otherwise combine the first nonce (NonceA), the first device authentication key certificate (CertDAKA), and the first identity attribute certificate (IACA) to generate the request datagram. In some embodiments, the first device authentication key certificate (CertDAKA) and the first identity attribute certificate (IACA) are locally stored by the first authentication module. For example, the certificates may be stored in a local memory (e.g., ROM, RAM, flash memory, or other non-transitory storage medium) of the first authentication module.

The second authentication module is configured to validate the request datagram by verifying the first device authentication key certificate (CertDAKA) and the first identity attribute certificate (IACA) with public keys that are generated by a device lifecycle managements system (DLM) or derived utilizing crypto library functions. In this regard, the public keys may be stored in SRAM or another local memory of the authentication module and used with crypto library functions to verify or cryptographically sign exchanged data, such as the nonces exchanged between the authentication modules. In some embodiments, the second authentication module may verify the certificates with an elliptic curve digital signing algorithm (hereinafter "ECDSA") or other verification operation. In some embodiments, the second authentication module may be further configured to validate the certificate values from plain text values by verifying the following: certificate type is device authentication key (hereinafter "DAK") or identity attribute certificate (hereinafter "IAC") for each certificate; IAC names match, DAK certificate module type matches module type argument; and/or microprocessor serial number (hereinafter "MPSN") of each certificate in the message payload match each other. In some embodiments, the second authentication module may be further configured to verify the DAK and IAC certificates are not in a local revocation list (e.g., a list or database including revoked and/or invalid certificates). When the second authentication module fails to validate the request datagram, the second authentication module may generate an error message, partially or completely disable the first authentication module, and/or discontinue or restrict communications to/from the first authentication module.

Responsive to a valid request datagram, the second authentication module is configured to transmit a response datagram to the first authentication module. In implementations, the response datagram includes a second plain text nonce (NonceB), a first signature associated with the first and second nonces (SigB[NonceA||NonceB]), a second device authentication key certificate (certDAKB) containing a second device authentication key (DAKB), and a second identity attribute certificate (IACB). In some embodiments, the second authentication module is configured to generate the second nonce (NonceB) with a TRNG, concatenate or otherwise combine the first nonce (NonceA) and the second nonce (NonceB), and sign the concatenated/combined nonces with a private key (e.g., DAK) that is locally stored by the second authentication module. The second authentication module is further configured to concatenate or otherwise combine the second nonce (NonceB), the first signature associated with the first and second nonces (SigB [NonceA||NonceB]), the second device authentication key certificate (certDAKB), and the second identity attribute certificate (IACB) to generate the response datagram. In some embodiments, the second device authentication key certificate (CertDAKB) and the second identity attribute certificate (IACB) are locally stored by the second authentication module. For example, the certificates may be stored in a local memory (e.g., ROM, RAM, flash memory, or other non-transitory storage medium) of the second authentication module.

The first authentication module is configured to validate the response datagram by verifying the second device authentication key certificate (CertDAKB) and the second identity attribute certificate (IACB) with public keys that are locally stored or retrieved from a crypto library utilizing ECDSA or another verification operation. In some embodiments, the first authentication module may be further configured to validate the certificate values from plain text values by verifying the following: IAC & DAK certificates have matching MPSNs, IAC names match, certificate types are correct on both certificates (IAC & DAK), the correct issuer name is on both certificates, DAK module type is the correct type (e.g., communications/control module). In some embodiments, the first authentication module may be further configured to verify the DAK and IAC certificates are not in a local revocation list.

To validate the response datagram, the first authentication module is further configured to verify the first signature associated with the first and second nonces (sigB[NonceA||NonceB]). In some embodiments, the first authentication module is configured to verify the first signature (sigB [NonceA||NonceB]) by concatenating the first locally stored nonce (NonceA) and the second plaintext nonce (NonceB) received from the second authentication module, verifying the first cryptographic signature (sigB[NonceA∥NonceB]) with a public device authentication key (e.g., using DAKB from certDAKB), and comparing the locally generated concatenation of the first nonce and the second nonce with the cryptographically verified concatenation of the first nonce and the second nonce. When the first authentication module fails to validate the response datagram, the first authentication module may generate an error message, partially or completely disable the second authentication module, and/or discontinue or restrict communications to/from the second authentication module.

The first authentication module is further configured to transmit an authentication datagram to the second authentication module when the response datagram is valid. In implementations, the authentication datagram includes a second signature associated with the first and second nonces (sigA[NonceA∥NonceB]). In some embodiments, the first authentication module is configured to sign the locally generated concatenation of the first and second nonces a private key (e.g., DAK) that is locally stored by the first authentication module. When the response datagram is invalid, the authentication datagram may be replaced with a "failed" authentication datagram including a signature associated with the second nonce and an error reporting (e.g., "failure") message (sigA[NonceB∥Error]) generated by the first authentication module.

Responsive to the authentication datagram, the second authentication module may be further configured to transmit a responsive authentication datagram to the first authentication module. In implementations, the responsive authentication datagram includes a signature associated with the first nonce and an error reporting (e.g., "success" or "failure") message (sigB[NonceA∥Error]) generated by the second authentication module. In some embodiments, the second authentication module is configured to validate the authentication datagram by verifying the second signature associated with the first and second nonces (sigA[NonceA∥NonceB]). In some embodiments, the second authentication module is configured to verify the second signature (sigA[NonceA∥NonceB]) by concatenating the first plaintext nonce (NonceA) received from the first authentication module and the second locally stored nonce (NonceB), verifying the second cryptographic signature (sigA[NonceA∥NonceB]) with a public device authentication key (e.g., using DAKA from certDAKA), and comparing the locally generated concatenation of the first nonce and the second nonce with the cryptographically verified concatenation of the first nonce and the second nonce. In addition to the error reporting message, when the second authentication module fails to validate the authentication datagram, the second authentication module may partially or completely disable the first authentication module, and/or discontinue or restrict communications to/from the first authentication module.

In implementations where the devices employing the authentication modules are arranged according to a "master-slave" configuration, the master (e.g., the first authentication module) may be configured to authenticate each slave. In the event of a failed authentication, the master may at least partially disable or restrict communications to/from the unauthenticated slave. Alternatively, two or more slave modules operating in parallel without a master may authenticate one another, where a failed authentication results in both devices being partially or completely disabled. For example, two or more redundant power supplies 120 can be disabled should they fail to successfully complete the authentication sequence at startup or another predefined time/event.

Referring now to FIGS. 7 and 8, each power supply 120 or any other industrial element/controller 206 can be at least partially operated according to requests/commands from an action originator 202. In implementations, the action originator 202 is an operator interface 208 (e.g., SCADA and/or HMI), an engineering interface 210 including an editor 212 and a compiler 214, a local application 220, a remote application 216 (e.g., communicating through a network 218 via a local application 220), and so forth. In the authentication path 200 illustrated in FIGS. 7 and 8, the industrial element/controller 206 (e.g., the power supply 120) processes an action request (e.g., request for data, control command, firmware/software update, set point control, application image download, or the like) only when the action request has been signed and/or encrypted by an action authenticator 204. This prevents unauthorized action requests from valid user profiles and further secures the system from unauthorized action requests coming from invalid (e.g., hacked) profiles.

In embodiments of the disclosure, the action authenticator 204 can be on-site with the action originator 202 (e.g., directly connected device lifecycle management system (DLM) 222 or secured workstation 226) or remotely located (e.g., DLM 222 connected via the network 218). In general, the action authenticator 204 includes a storage medium with a private key stored thereon and a processor configured to sign and/or encrypt the action request generated by the action originator 202 with the private key. The private key is stored in a memory that may not be accessed via standard operator login. For instance, the secured workstation 226 can require a physical key, portable encryption device (e.g., smart card, RFID tag, or the like), and/or biometric input for access.

In some embodiments, the action authenticator 204 includes a portable encryption device such as a smart card 224 (which can include a secured microprocessor). In this manner, the entire device (including the privately stored key and processor in communication therewith) can be carried with an operator or user that has authorized access to an interface of the action originator 202. Whether the action authentication node 204 accesses the authentication path 200 via a secured or an unsecured workstation, the action request from the action originator 202 can be securely signed and/or encrypted within the architecture of the portable encryption device (e.g., as opposed to using a potentially less secure workstation or cloud-based architecture). By way of example, an unauthorized person would have to physically take possession of the smart card 224 before being able to authenticate any action requests sent via the action originator 202.

In some embodiments, multiple layers of security can be employed. For example, the action authenticator 204 can include a secured workstation 226 that may be only accessible to sign and/or encrypt action requests via smart card 224 access. Additionally, the secured workstation 226 may be accessible via a biometric or multifactor cryptography device 228 (e.g., one or more of a fingerprint scanner, an iris scanner, a facial recognition device, and so on). In some embodiments, a multifactor cryptography device 228 can require a valid biometric input before enabling the smart card 224 or other portable encryption device to sign an action request.

The power supply 120 or any other industrial element/controller 206 being driven by the action originator 202 is configured to receive the signed action request, verify the authenticity of the signed action request, and perform a requested action when the authenticity of the signed action request is verified. In some embodiments, the industrial element/controller 206 (e.g., the power supply 120) includes a storage medium (e.g., SD/micro-SD card, HDD, SSD, or any other non-transitory storage device) (e.g., the memory 142 of the power supply 120) configured to store the action request (e.g., application image, control command, and/or any other data sent by the action originator). The industrial element/controller 206 further includes a processor (e.g., the processor 140 of the power supply 120) that performs/executes the action request (i.e., performs the requested action) after the signature is verified. In some embodiments, the action request is encrypted by the action originator 202 and/or the action authenticator 204 and must also be decrypted by the processor 140 before the requested action can be performed. In implementations, the industrial element/controller 206 includes a virtual key switch 234 (e.g., a software module running on the processor 140) that enables the processor 140 to perform the requested action only after the action request signature is verified and/or after the action request is decrypted. In some embodiments, each and every action or each one of a selection of critical actions must clear the authentication path before being run on the industrial element/controller 206.

FIG. 9 depicts a process 300, in accordance with example embodiments, for authenticating an action request in an industrial control system. In implementations, the process 300 can be manifested by the industrial control system 100 (e.g., as described with reference to FIGS. 1 through 6) and/or the authentication path 200 (e.g., as described with reference to FIGS. 7 and 8) of the industrial control system 100. An action request is originated (Block 310). For example, an operator/engineering interface 208/210 and/or a remote/local application interface 216/220 is used to generate and action request. Then, the action request is signed with the action authenticator (Block 320). For instance, action authenticator 204 is used to sign an action request. In some embodiments, the action request can be encrypted with the action authenticator (Block 322). Then, the signed action request is sent (e.g., downloaded) to an industrial element/controller (Block 330). For example, the action request is furnished to the industrial element/controller 206 (e.g., to power supply 120). Next, the authenticity of the signed action request is verified (Block 340). In some embodiments, the action request can be decrypted with the industrial element/controller (Block 342). For instance, the industrial element/controller 206 can decrypt the action request. Then, a requested action can be performed when the authenticity of the signed action request is verified (Block 350). For example, the power supply 120 performs an action requested by the operator/engineering interface 208, 210 and/or the remote/local application interface 216, 220.

For enhanced security, the industrial element/controller 206 (e.g., the power supply 120) can be further configured to perform an authentication sequence with the action authenticator 204 (e.g., with a smart card 224) before the requested action is run by the industrial element/controller 206. For example, the so-called "handshake" can be performed prior to Block 350 or even prior to Block 330. In some embodiments, the signature and verification Blocks 320 and 340 can be executed using a more intricate authentication sequence. Additionally, in some embodiments, the authentication sequence can be performed as an additional security measure to augment the simpler signature verification and/or decryption measures.

In some embodiments, an authentication sequence implemented by the industrial element/controller 206 can include sending a request datagram to the action authenticator 204, e.g., where the request datagram includes a first cryptographic nonce, a first device authentication key certificate (e.g., a first authentication certificate that contains a device authentication key), and a first identity attribute certificate. Then, a response datagram is received from the action authenticator 204, e.g., where the response datagram includes a second nonce, a first signature associated with the first and second nonces, a second device authentication key certificate (e.g., a second authentication certificate that contains a device authentication key), and a second identity attribute certificate. Next, the response datagram can be validated by verifying the first signature associated with the first and second nonces, the second device authentication key certificate, and the second identity attribute certificate. Next, an authentication datagram can be sent to the action authenticator 204 (e.g., when the response datagram is determined to be valid), where the authentication datagram includes a second signature associated with the first and second nonces.

Alternatively, the action authenticator 204 can initiate the handshake, in which case the authentication sequence implemented by the industrial element/controller 206 can include receiving a request datagram from the action authenticator 204, e.g., where the request datagram includes a first nonce, a first device authentication key certificate, and a first identity attribute certificate. Next, the request datagram can be validated by verifying the first device authentication key certificate and the first identity attribute certificate. Then, a response datagram can be sent to the action authenticator when the request datagram is valid, e.g., where the response datagram includes a second nonce, a first signature associated with the first and second nonces, a second device authentication key certificate, and a second identity attribute certificate. Next, an authentication datagram from the action authenticator 204 can be received, e.g., where the authentication datagram includes a second signature associated with the first and second nonces. Then, the authentication datagram can be validated, e.g., by verifying the second signature associated with the first and second nonces.

The handshake or authentication sequence that can be implemented by the industrial element/controller 206 and the action authenticator 204 can be accomplished using one or more of the techniques described above (e.g., with reference to authentication performed by the authentication modules). Further, each of the action originator 202, the action authenticator 204, and the industrial element/controller 206 can include circuitry and/or logic enabled to perform the functions or operations (e.g., steps of method 300 and the authentication sequence) described herein. For example, each of the action originator 202, the action authenticator 204, and the industrial element/controller 206 can include one or more processors that execute program instruction stored permanently, semi-permanently, or temporarily by a non-transitory machine readable medium such as, but not necessarily limited to: a hard disk drive (HDD), solid-state disk (SDD), optical disk, magnetic storage device, flash drive, or SD/micro-SD card.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A power supply, comprising:
   a battery module comprising:
      a battery cell; and
      a battery monitor communicatively coupled to the battery cell and configured to retrieve at least one of battery cell operation information and battery cell status information from the battery cell; and
   a controller communicatively coupled to the battery module and configured to:
      receive the at least one of battery cell operation information and battery cell status information from the battery monitor,
      implement diagnostics at a battery module level associated with the battery module based on the received at least one of the battery cell operation information and battery cell status information, and
      provide network access to the at least one of the battery cell operation information, the battery cell status information, and the implemented diagnostics via a controller communications interface.

2. The power supply as recited in claim 1, wherein the battery cell comprises a lithium-ion battery cell.

3. The power supply as recited in claim 1, wherein the power supply comprises a plurality of battery modules, wherein each of the battery modules is configured to connect with another one of the battery modules by stacking.

4. The power supply as recited in claim 3, wherein each one of the battery modules is encased by a respective battery module protection layer.

5. The power supply as recited in claim 4, wherein the plurality of battery modules is encased by a battery pack protection layer.

6. The power supply as recited in claim 5, further comprising a power supply protection layer that encases the plurality of battery modules and the self-hosted server, the power supply protection layer defining a rigid encasement that is mountable in one or more orientations.

7. The power supply as recited in claim 1, wherein the diagnostic information comprises at least one of an operating voltage of the battery cell, an operating current of the battery cell, an electrical charge associated with the battery cell, or an age associated with the battery cell.

8. A power supply network, comprising:
   a first power supply;
   a second power supply communicatively coupled to the first power supply, wherein each of the first and the second power supplies comprises:
      a battery cell;
      a battery monitor communicatively coupled to the battery cell and configured to retrieve at least one of battery cell operation information and battery cell status information from the battery cell; and
      a controller communicatively coupled to the battery module and configured to:
         receive at least one of the battery cell operation information and the battery cell status information from the battery monitor,
         implement diagnostics at a battery module level associated with the battery module based on the received at least one of the battery cell operation information and battery cell status information, and
         provide network access to the at least one of the battery cell operation information, the battery cell status information, and the implemented diagnostics via a controller communications interface.

9. The power supply network as recited in claim 8, wherein the battery cell comprises a lithium-ion battery cell.

10. The power supply network as recited in claim 8, wherein each power supply comprises a plurality of battery modules, wherein each of the battery modules is configured to connect with another one of the battery modules by stacking.

11. The power supply network as recited in claim 10, wherein each one of the battery modules is encased by a respective battery module protection layer.

12. The power supply network as recited in claim 11, wherein the plurality of battery modules is encased by a battery pack protection layer.

13. The power supply network as recited in claim 12, wherein each power supply further comprises a power supply protection layer that encases the plurality of battery modules and the self-hosted server, the power supply protection layer defining a rigid encasement that is mountable in one or more orientations.

14. The power supply network as recited in claim 8, wherein the diagnostic information comprises at least one of an operating voltage of the battery cell, an operating current of the battery cell, an electrical charge associated with the battery cell, or an age associated with the battery cell.

15. An industrial control system, comprising:
   a control module;
   an input/output module communicatively coupled to the control module and configured to be controlled and monitored by the control module, the input/output module configured to at least one of receive input signals from a sensor and provide output signals for at least one of an actuator and a motor;
   a power module for furnishing power to at least one of the control module and the input/output module; and a power supply for distributing power to the power module, the power supply comprising:
a battery module comprising:
a battery cell;
a battery monitor communicatively coupled to the battery cell and configured to retrieve at least one of battery cell operation information and battery cell status information from the battery cell; and
a controller communicatively coupled to the battery module and configured to:
receive at least one of the battery cell operation information and the battery cell status information from the battery monitor,
implement diagnostics at a battery module level associated with the battery module based on the received at least one of the battery cell operation information and battery cell status information, and
provide network access to the at least one of the battery cell operation information, the battery cell status information, and the implemented diagnostics via a controller communications interface.

16. The industrial control system as recited in claim 15, wherein the battery cell comprises a lithium-ion battery cell.

17. The industrial control system as recited in claim 15, wherein the power supply comprises a plurality of battery modules, wherein each of the battery modules is configured to connect with another one of the battery modules by stacking.

18. The industrial control system as recited in claim 17, wherein each one of the battery modules is encased by a respective battery module protection layer.

19. The industrial control system as recited in claim 18, wherein the plurality of battery modules is encased by a battery pack protection layer.

20. The industrial control system as recited in claim 19, further comprising a power supply protection layer that encases the plurality of battery modules and the self-hosted server, the power supply protection layer defining a rigid encasement that is mountable in one or more orientations.

21. The industrial control system as recited in claim 15, wherein the diagnostic information comprises at least one of an operating voltage of the battery cell, an operating current of the battery cell, an electrical charge associated with the battery cell, or an age associated with the battery cell.

* * * * *